United States Patent
Bae et al.

(10) Patent No.: US 10,268,233 B2
(45) Date of Patent: Apr. 23, 2019

(54) FOLDABLE DEVICE

(71) Applicant: SAMSUNG ELECTRONICS CO., LTD., Suwon-si (KR)

(72) Inventors: Yu-dong Bae, Suwon-si (KR); Ho-seong Seo, Suwon-si (KR); Toshikazu Takayanagi, Suwon-si (KR); Wataru Kaihotsu, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/952,417

(22) Filed: Nov. 25, 2015

(65) Prior Publication Data

US 2016/0302314 A1 Oct. 13, 2016

Related U.S. Application Data

(60) Provisional application No. 62/145,135, filed on Apr. 9, 2015.

(30) Foreign Application Priority Data

Jun. 22, 2015 (KR) .......................... 10-2015-0088718

(51) Int. Cl.
*G06F 1/16* (2006.01)
(52) U.S. Cl.
CPC ..................... *G06F 1/16* (2013.01)
(58) Field of Classification Search
CPC .. H05K 5/0017; H05K 5/0086; H05K 5/0226; H05K 1/028; H05K 5/0217;

(Continued)

(56) References Cited

U.S. PATENT DOCUMENTS 7,446,757 B2 11/2008 Mochizuki et al.
7,478,458 B2 1/2009 Tajima
(Continued)

FOREIGN PATENT DOCUMENTS

CN 103294113 A 9/2013
CN 103608745 A 2/2014
(Continued)

OTHER PUBLICATIONS

International Search Report (PCT/ISA/210) dated Jul. 29, 2016 issued by the International Searching Authority in counterpart International Application No. PCT/KR2016/003791.

(Continued)

*Primary Examiner* — Dimary Lopez Cruz
*Assistant Examiner* — Ingrid Wright
(74) *Attorney, Agent, or Firm* — Sughrue Mion, PLLC

(57) ABSTRACT

A foldable device includes a first body and a second body that support a flexible display device and change between an unfolding position and a folding position at which the flexible display device is received in the first and second bodies to have a droplet shape. A first support portion and a second support portion are respectively provided on the first and second bodies, are maintained at a support position at which the first and second support portions support a third part when the first and second bodies are in a position between the unfolding position and a receiving start position, and move to a receiving position at which the first and second support portions move away from the third part to form a receiving space when the first and second bodies fold beyond the receiving start position.

24 Claims, 21 Drawing Sheets

(58) Field of Classification Search
CPC ......... H05K 1/147; H05K 2201/10128; H05K 5/03; H05K 1/02; G06F 1/1652; G06F 1/1641; G06F 3/041; G06F 1/1616; G06F 1/1681; G06F 1/16; G06F 1/1684; G06F 1/1626; G06F 1/1637; G06F 1/1647; G06F 1/1649; G06F 1/1656; G06F 1/3218

See application file for complete search history.

(56) References Cited

U.S. PATENT DOCUMENTS

| | | | |
|---|---|---|---|
| 8,228,667 | B2 | 7/2012 | Ma |
| 8,908,365 | B2 | 12/2014 | Wafters et al. |
| 8,938,856 | B1 | 1/2015 | Shin et al. |
| 8,971,031 | B2 | 3/2015 | Mok et al. |
| 9,013,864 | B2 | 4/2015 | Griffin et al. |
| 9,173,288 | B1 * | 10/2015 | Kim ................ G06F 1/1633 |
| 9,348,450 | B1 * | 5/2016 | Kim ................ G06F 1/1681 |
| 2004/0052044 | A1 | 3/2004 | Mochizuki et al. |
| 2006/0218750 | A1 | 10/2006 | Tajima |
| 2012/0044620 | A1 | 2/2012 | Song et al. |
| 2012/0149438 | A1 | 6/2012 | Kwon |
| 2012/0243207 | A1 | 9/2012 | Wang et al. |
| 2012/0314399 | A1 | 12/2012 | Bohn et al. |
| 2013/0021762 | A1 | 1/2013 | van Dijk et al. |
| 2013/0037228 | A1 | 2/2013 | Verschoor et al. |
| 2013/0314611 | A1 | 11/2013 | Okutsu et al. |
| 2014/0042293 | A1 | 2/2014 | Mok et al. |
| 2014/0328041 | A1 | 11/2014 | Rothkopf et al. |
| 2014/0355195 | A1 | 12/2014 | Kee et al. |
| 2015/0013107 | A1 | 1/2015 | Shin et al. |

FOREIGN PATENT DOCUMENTS

| | | |
|---|---|---|
| JP | 2004-109382 A | 4/2004 |
| KR | 10-2006-0106697 A | 10/2006 |
| KR | 10-2011-0002729 A | 1/2011 |
| KR | 10-2012-0016873 A | 2/2012 |
| KR | 10-1148397 B1 | 5/2012 |
| KR | 10-1442622 B1 | 9/2014 |
| KR | 10-2015-0006633 A | 1/2015 |

OTHER PUBLICATIONS

Written Opinion (PCT/ISA/237) dated Jul. 29, 2016 issued by the International Searching Authority in counterpart International Application No. PCT/KR2016/003791.

Communication dated Nov. 30, 2016, issued by the Korean Intellectual Property Office in counterpart Korean application No. 10-2015-0088718.

Communication dated Feb. 16, 2018, issued by the European Patent Office in counterpart European Application No. 16776955.3.

Communication dated Jul. 19, 2018, issued by the Korean Intellectual Property Office in counterpart Korean Patent Application No. 10-2017-0080341.

Communication dated Nov. 28, 2018, issued by the State Intellectual Property Office of People's Republic of China in counterpart Chinese Application No. 201680000502.1.

Communication dated Jul. 27, 2016, issued by the Korean Intellectual Property Office in counterpart Korean Application No. 10-2015-0088718.

International Search Report dated Jul. 29, 2016 issued by the International Searching Authority in counterpart International Application No. PCT/KR2016/003791.

Written Opinion dated Jul. 29, 2016 issued by the International Searching Authority in counterpart International Application No. PCT/KR2016/003791.

* cited by examiner

FOLDABLE DEVICE

CROSS-REFERENCE TO RELATED APPLICATION

This application claims priority from Korean Patent Application No. 10-2015-0088718, filed on Jun. 22, 2015 in the Korean Intellectual Property Office, and U.S. Provisional Application No. 62/145,135, filed on Apr. 9, 2015 in the U.S. Patent and Trademark Office, the disclosures of which are incorporated herein in their entirety by reference.

BACKGROUND

1. Field

Apparatuses and methods consistent with exemplary embodiments relate to a foldable device including a flexible display device.

2. Description of the Related Art

A portable foldable device (hereinafter, referred to as a mobile device) such as a communication terminal, a game console, a multimedia device, a portable computer, or a photographing apparatus generally includes a display device that displays image information and an input unit such as a keypad. Many mobile devices have a foldable structure that may be folded into a smaller size in order to improve the portability thereof. In such mobile devices, two bodies are connected to each other via the foldable structure. Since a related art display device is not foldable, the display device may be arranged on one of two bodies. Hence, it may difficult to implement a large display device to a mobile device having a foldable structure.

Along with the development of a flexible and bendable display device, there have been attempts to implement the display device to a mobile device having a foldable structure. In this case, since the flexible display device may be arranged over two bodies to cross over the foldable structure, a large screen may be provided. However, although the flexible display device may be bent, if the flexible display device is sharply bent, the flexible display device may be damaged. Hence, a curved portion having a predetermined curvature is formed at the center of the flexible display device when the flexible display device folds.

SUMMARY

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments include a foldable device that has a small size and is portable.

One or more exemplary embodiments include a foldable device on which a flexible display device is supported flat when the foldable device unfolds.

One or more exemplary embodiments include a foldable device that may reduce distortion of a screen when the foldable device unfolds at an obtuse angle.

According to an aspect of an exemplary embodiment, there is provided a foldable device including: a hinge shaft that includes first and second hinge shafts; a flexible display device that includes a first part, a second part, and a third part between the first part and the second part; a first body that includes a first fixed portion to which the first part is fixed, rotates around the first hinge shaft, and moves between a folding position and an unfolding position, and is movable to or from the first hinge shaft; a first support portion that is provided on the first body and moves between a support position and a receiving position, the support position enabling the first support portion to partially support the third part, the receiving position enabling the third part to be bent to form a curved receiving space in the first body; and a restriction unit configured to maintain the first support portion at the support position when the first body is in a position between the unfolding position and a start point of the receiving position and allow the first support portion to move to the receiving position when the first body folds beyond the receiving start position.

The foldable device may further include: a second body that includes a second fixed portion to which the second part is fixed, rotates around the second hinge shaft, moves between a folding position and an unfolding position, and is movable to or from the second hinge shaft; and a second support portion that is provided on the second body and moves between a support position and a receiving position, the support position enabling the second support portion to partially support the third part, the receiving position enabling the third part to be bent to form a curved receiving space in the second body. The restriction unit may be configured to maintain the second support portion at the support position when the second body is in a position between the unfolding position and a start point of the receiving position and allow the second support portion to move to the receiving position when the second body folds beyond the receiving start position. The support position enabling the second support portion to partially support the third part may correspond to the support position enabling the first support portion to partially support the third part. The receiving position enabling the third part to be bent to form a curved receiving space in the first body may correspond to the receiving position enabling the third part to be bent to form a curved receiving space in the second body.

At the folding position, the first part and the second part may be located closer to each other than at the unfolding position, and face each other. The third part may be bent from the first and second parts into the first and second bodies and received in the receiving space in a droplet shape.

The foldable device may further include a first gear portion and a second gear portion that are respectively provided on the first and second hinge shafts and are engaged with each other so that the first and second bodies synchronously rotate together.

The foldable device may further include a locking unit configured to lock the first body and the second body at at least one inclined position between the unfolding position and the folding position. An opening angle between the first body and the second body at the receiving start position may be equal to or less than an opening angle between the first body and the second body at the at least one inclined position.

The restriction unit may include: a first support arm and a second support arm that respectively support the first support portion and the second support portion and respectively pivot about fixed positions with respect to the first hinge shaft and the second hinge shaft; a first guide pin and a second guide pin that are respectively provided on the first support arm and the second support arm; and a first guide slot and a second guide slot that respectively rotate around the first hinge shaft and the second hinge shaft along with the first body and the second body, respectively guide the first guide pin and the second guide pin, and include support parts that maintain the first support arm and the second support arm at a position at which the first support arm and the second support arm support the first support portion and the second support portion and receiving parts that allow the first support arm and the second support arm to move away from the first support portion and the second support portion so that the first support portion and second support portion are allowed to move to the receiving position.

Each of the first support arm and the second support arm may include: a first link arm that pivots about the fixed position; and a second link arm having one end portion that is pivotably connected to the first link arm by the first guide pin or the second guide pin and another end portion that is pivotably connected to the first support portion or the second support portion and supports the first support portion or the second support portion.

The restriction unit may include: a rotating cam that supports the first support portion and the second support portion and includes a first cam path corresponding to the support position and a second cam path corresponding to the receiving position; a pinion gear that is connected to the rotating cam; a rack gear that is engaged with the pinion gear; a pulley; and a connection member having one end portion that is connected to a fixed position with respect to the hinge shaft and another end portion that is connected through the pulley to the rack gear and moves the rack gear when the first body and the second body fold or unfold.

The connection member may have a strip shape having bending elasticity.

The connection member may include a wire, and the foldable device may further include a return spring that is connected to the rack gear and applies a tensile force to the wire.

The foldable device may further include a path difference compensating unit configured to restrict an amount of movement of at least one of the first body and the second body to or from the hinge shaft, and compensate for a path difference between the flexible display device and the first body and a path difference between the flexible device and the second body while the foldable device folds or unfolds.

The path difference compensating unit may be further configured to enable at least one of the first body and the second body to move away from the hinge shaft during a period when the foldable device moves from the unfolding position to a changing position and enable at least one of the first body and the second body to move toward the hinge shaft during a period when the foldable device moves from the changing position to the folding position.

An opening angle between the first and second bodies at the changing position may be equal to an opening angle between the first and second bodies at the receiving start position.

The foldable device may further include: a first hinge unit that is pivotably connected to the first hinge shaft and is connected to the first body; and a second hinge unit that is pivotably connected to the second hinge shaft and is connected to the second body. The first body and the second body may be respectively connected to the first hinge unit and the second hinge unit so that the first body and the second body respectively move to or from the first hinge shaft and the second hinge shaft.

The first hinge unit and the second hinge unit may respectively include: a first hinge frame and a second hinge frame that are respectively rotatably connected to the first hinge shaft and the second hinge shaft; and a first movable frame and a second movable frame that are respectively supported on the first hinge frame and the second hinge frame so that the first movable frame and the second movable frame respectively move to or from the first hinge shaft and the second hinge shaft. The first body and the second body are respectively coupled to the first movable frame and the second movable frame.

The path difference compensating unit may include: a first restriction pin and a second restriction pin that have fixed positions with respect to the first hinge shaft and the second hinge shaft; and restriction slots into which the first restriction pin and the second restriction pin are respectively inserted and that respectively restrict amounts of movement of the first body and the second body according to rotation angles of the first body and the second body while the restriction slots pivot along with the first body and the second body.

According to an aspect of another exemplary embodiment, there is provided a foldable device including: a flexible display device that includes a first part, a second part, and a third part between the first part and the second part; a first body and a second body to which the first part and the second part are respectively fixed, and that move between an unfolding position and a folding position at which the first part and the second part are located closer to each other that at the unfolding position and face each other and the third part is bent from the first part and the second part into the first body and the second body and is received in a receiving space in a droplet shape; and a first support portion and a second support portion that are respectively provided on the first body and the second body to support the third part and are maintained at a support position at which the first support portion and the second support portion support the third part when the first body and the second body are in a position between the unfolding position and a starting point of a receiving position and move to the receiving position at which the first support portion and the second support portion move away from the third part to form the receiving space when the first body and the second body fold beyond the receiving start position.

The first body and the second body may respectively rotate about a first hinge shaft and a second hinge shaft and move between the unfolding position and the folding position. The foldable device may further include a first gear portion and a second gear portion that are respectively provided on the first hinge shaft and the second hinge shaft and are engaged with each other so that the first body and the second body synchronously rotate together.

The foldable device may further include a locking unit configured to lock the first body and the second body at at least one inclined position between the unfolding position and the folding position. An opening angle between the first body and the second body at the starting point of the receiving position may be equal to or less than an opening angle between the first body and the second body at the at least one inclined position.

The first body and the second body may be respectively movable to or from the first hinge shaft and the second hinge shaft.

The foldable device may further include a path difference compensating unit configured to restrict an amount of movement of at least one of the first body and the second body to or from the first hinge shaft and the second hinge shaft, and compensate for a path difference between the flexible display device and the first body and a path difference between the flexible display device and the second body while the foldable device folds or unfolds.

According to an aspect of another exemplary embodiment, there is provided a foldable device including: a hinge unit including a hinge shaft, a restriction slot, and a restriction pin inserted into the restriction slot; and a body configured to be move between a folding position and a unfolding position and connected to the hinge unit through the restriction pin; wherein a position of the restriction pin changes along the restriction slot while the body moves between the folding position and the unfolding position, wherein the body moves away from the hinge shaft when the body moves from the unfolding position to the folding position.

BRIEF DESCRIPTION OF THE DRAWINGS

The above and/or other aspects will be more apparent by describing certain exemplary embodiments, taken with reference to the accompanying drawings, in which.

DETAILED DESCRIPTION

Figure 1:
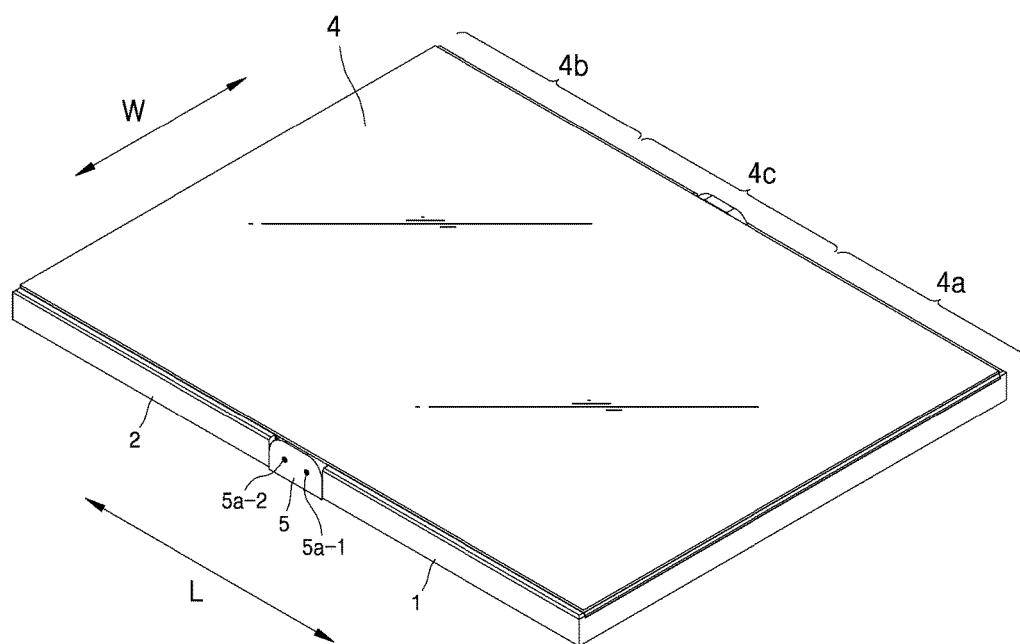
FIG. 1 is a perspective view illustrating an outer appearance of a foldable device according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

As used herein, the term "and/or" includes any and all combinations of one or more of the associated listed items. Expressions such as "at least one of" when preceding a list of elements, modify the entire list of elements and do not modify the individual elements of the list.

Figure 2:
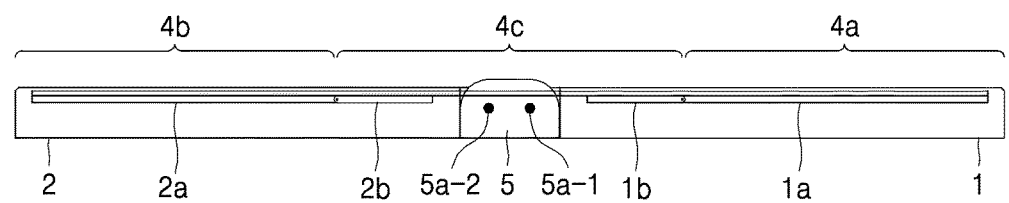
FIG. 2 is a side view illustrating an unfolding state of the foldable device of FIG. 1 according to an exemplary embodiment.
Figure 3:
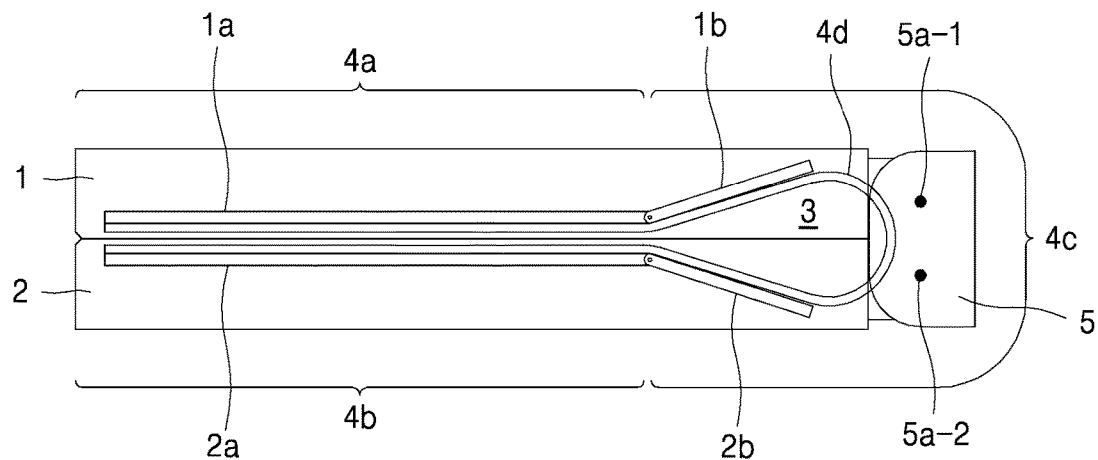
FIG. 3 is a side view illustrating a folding state of the foldable device of FIG. 1 according to an exemplary embodiment.

FIG. 1 is a perspective view illustrating an outer appearance of a foldable device according to an exemplary embodiment. FIG. 2 is a side view illustrating an unfolding state of the foldable device of FIG. 1 according to an exemplary embodiment. FIG. 3 is a side view illustrating a folding state of the foldable device of FIG. 1 according to an exemplary embodiment.

Referring to FIGS. 1 through 3, the foldable device may include first and second bodies 1 and 2 and a flexible display device 4. The first and second bodies 1 and 2 are connected to each other and may move between an unfolding position of FIG. 2 and a folding position of FIG. 3.

Figure 4:
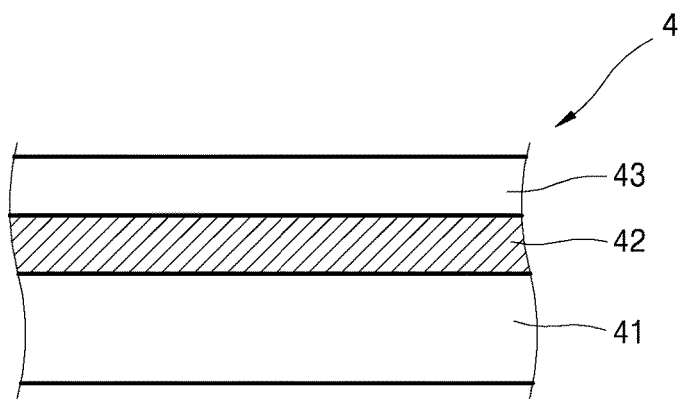
FIG. 4 is a cross-sectional view of a flexible display device according to an exemplary embodiment.

FIG. 4 is a cross-sectional view of the flexible display device 4 according to an exemplary embodiment. Referring to FIG. 4, the flexible display device 4 may include a flexible display panel 41 that displays an image and a transparent protective panel 43 that is disposed on the flexible display panel 41. An additional panel or substrate may be disposed between the transparent protective panel 43 and the flexible display panel 41. The flexible display panel 41 may be, for example, an organic light-emitting diode (OLED) panel. When the flexible display panel 41 is an OLED panel, an organic emission layer may be disposed between an upper substrate and a lower substrate. A polarization plate may be disposed on the upper substrate from which light is emitted. Also, the flexible display device 4 may further include a touch panel 42 as an input unit. For example, the touch panel 42 may be disposed between the transparent protective panel 43 and the flexible display panel 41. The flexible display panel 41, the touch panel 42, and the transparent protective panel 43 may be adhered to one another by using an optically-clear adhesive (OCA) layer. However, the present exemplary embodiment is not limited thereto, and the flexible display device 4 may further include any of various other optical panels or optical films.

The flexible display device 4 is partially fixed to the first body 1 and the second body 2. The flexible display device 4 may be divided into a first part 4a that is fixed to the first body 1, a second part 4b that is fixed to the second body 2, and a third part 4c that is formed between the first body 1 and the second body 2. The first body 1 includes a first fixed portion 1a to which the first part 4a is fixed, and the second body 2 includes a second fixed portion 2a to which the second part 4b is fixed. For example, the first part 4a and the second part 4b of the flexible display device 4 may be respectively fixed to the first fixed portion 1a and the second fixed portion 2a by using an adhesive unit such as an adhesive or a double-sided tape. Alternatively or additionally, the first part 4a and the second part 4b be may respectively fixed to the first fixed portion 1a and the second fixed portion 2b through an interference fit or a press fit. In other words, fastening between the first part 4a and the first fixed portion 1a may be achieved by friction after the first part 4a and the first fixed portion 1a are pushed together. Similarly, fastening between the second part 4b and the second fixed portion 2b may be achieved by friction after the second part 4b and the second fixed portion 2b are pushed together. The third part 4c of the flexible display device 4 may not be fixed to the first body 1 or the second body 2. That is, the third part 4c may not be adhered to the first and second bodies 1 and 2. When the first and second bodies 1 and 2 are located at the folding position of FIG. 3, the third part 4c forms a curved portion 4d having a predetermined radius of curvature. Accordingly, since the flexible display device 4 may not be sharply bent and the third part 4c is bent by forming the curved portion 4d or is spread, the first and second bodies 1 and 2 may change between the folding position and the unfolding position. Also, when the foldable device folds, since the flexible display device 4 may be received in a receiving space 3 in the first and second bodies 1 and 2, the foldable device may have a compact size and may be easily carried. That is, when the foldable device of the present exemplary embodiment folds, the first part 4a and the second part 4b of the flexible display device 4 are located close to each other to face each other. At the same time, the third part 4c may be bent from the first and second parts 4a and 4b into the first and second bodies 1 and 2 and is received in the receiving space 3 to have a droplet shape. Hence, the foldable device may have a compact size when the foldable device folds.

The first and second bodies 1 and 2 may be connected to each other. The position of the first and second bodies 1 and 2 may change between the unfolding position and the folding position due to a hinge unit 5. For example, the hinge unit 5 may include hinge shafts. The hinge shafts of the present exemplary embodiment may include first and second hinge shafts 5a-1 and 5a-2 that are spaced apart from each other in a longitudinal direction L. The first and second bodies 1 and 2 may respectively rotate about the first and second hinge shafts 5a-1 and 5a-2 to change between the unfolding position and the folding position.

The foldable device may be a portable mobile device such as a communication terminal, a game console, a multimedia device, a portable computer, or a photographing apparatus. The present exemplary embodiment is not limited thereto, and the foldable device may be any device as long as it includes the first body 1 to which the first part 4a of the flexible display device 4 is fixed and the second body 2 to which the second part 4b of the flexible display device 4 is fixed and that is foldably connected to the first body 1.

A processing unit and input/output units for performing functions according to the use of the foldable device may be provided on the first and second bodies 1 and 2. When the foldable device is a multimedia terminal that provides images and music, the processing unit may include an image information processing unit and an audio information processing unit. When the foldable device is a communication terminal, the processing unit may include a communication module. The input/output units may include an image input/output unit, an audio input/output unit, and a manipulation unit for user manipulation. The manipulation unit may be realized by using the touch panel 42 of the flexible display device 4.

Figure 5A:
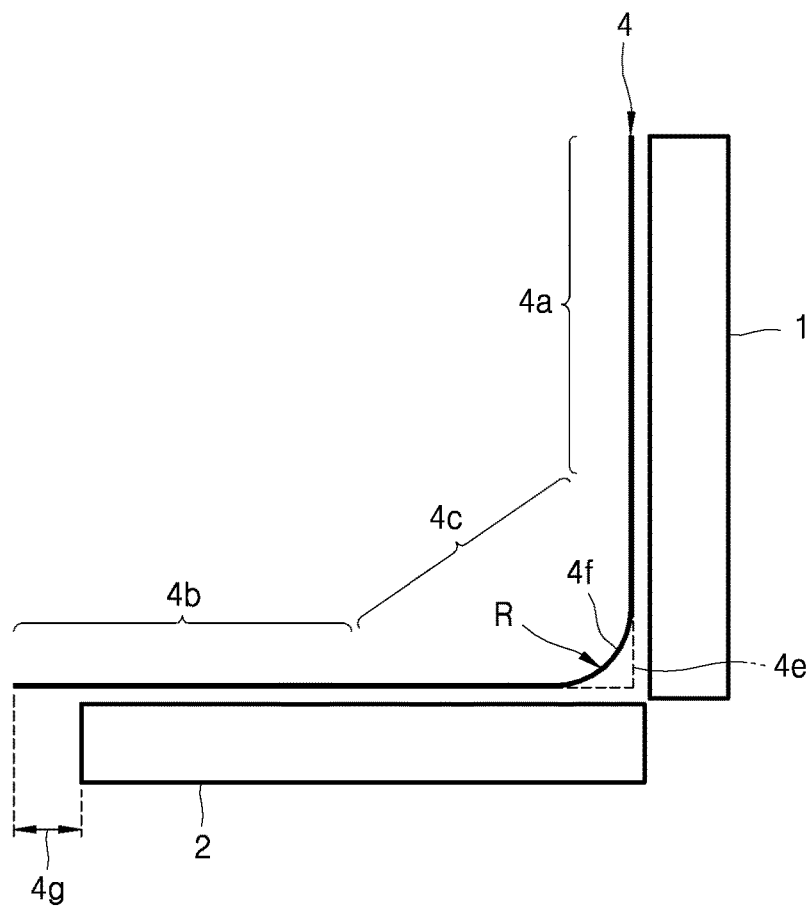
FIGS. 5A and 5B are schematic views illustrating a folding state of the foldable device at an angle of, for example, 90°.
Figure 5B:
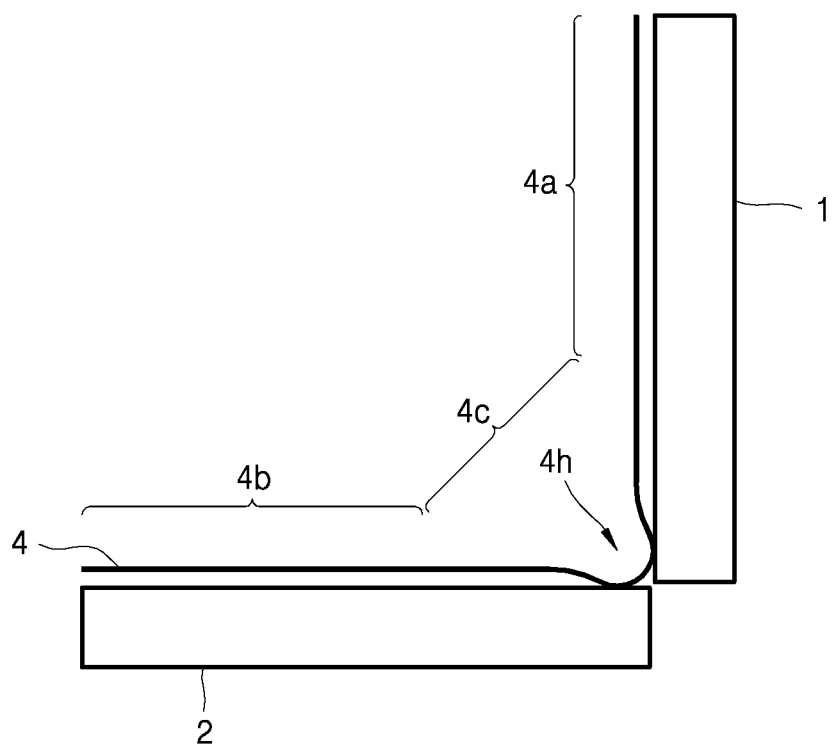

FIGS. 5A and 5B are schematic views illustrating a state wherein the foldable device is folded at an angle of, for example, 90°. Referring to FIGS. 5A and 5B, there is a difference (hereinafter, referred to as a folding/unfolding path difference) between a folding/unfolding path of the first and second bodies 1 and 2 and a folding/unfolding path of the flexible display device 4 when the first and second bodies 1 and 2 are folded/unfolded. For example, assuming that the flexible display device 4 is entirely fixed to the first and second bodies 1 and 2, when the first and second bodies 1 and 2 fold at an angle of 90°, the third part 4c is bent at a right angle as marked by a dashed line 4e in FIG. 5A. In this case, the folding/unfolding path difference is "0".

However, when the flexible display device 4 is sharply bent, the flexible display device 4 may be permanently deformed or may lose its function. Accordingly, in order for the flexible display device 4 to be smoothly bent during a folding/unfolding process, the third part 4c of the flexible display device 4 is not fixed to the first and second bodies 1 and 2. In this case, the third part 4c of the flexible display device 4 may have an arc shape having a radius of curvature R as marked by a solid line 4f in FIG. 5A due to its elasticity. A length difference 4g between a portion corresponding to the dashed line 4e and a portion corresponding to the solid line 4f is the folding/unfolding path difference. The folding/unfolding path difference may be presented as 2R−2πR/4. Hereinafter, the folding/unfolding path difference is denoted by reference numeral 4g. If the second part 4b of the flexible display device 4 is fixed to the second body 2 and the first part 4a of the flexible display device 4 is not fixed to the first body 1, the flexible display device 4 is pushed toward an end portion of the first body 1 by as much as the folding/unfolding path difference 4g. Accordingly, the third part 4c of the flexible display device 4 may be smoothly bent inward as marked by the solid line 4f.

If the first and second parts 4a and 4b of the flexible display device 4 are respectively fixed to the first and second bodies 1 and 2, the third part 4c of the flexible display device 4 is bent both inward and outward and thus an uneven portion 4h is formed as shown in FIG. 5B. The uneven portion 4h may cause the flexible display device 4 to be permanently deformed. Also, when the first and second bodies 1 and 2 are used at an opening angle ranging from, for example, about 90° to about 180°, distortion of a screen may occur at the uneven portion 4h. Also, when the third part 4c is repeatedly bent inward and outward, the flexible display device 4 may be permanently deformed or damaged at the uneven portion 4h.

A length of the first body 1 may be extended by as much as the folding/unfolding path difference 4g so that the first body 1 has an extended portion and the first part 4a of the flexible display device 4 may slide along the first body 1. However, in this case, when the first and second 1 and 2 completely unfold, the extended portion of the first body 1 may not be covered by the flexible display device 4.

According to an exemplary embodiment, at least one of the first and second bodies 1 and 2 may move to or from the first and second hinge shafts 5a-1 and 5a-2 to compensate for the folding/unfolding path difference 4g during a folding/unfolding process. For example, when the first and second bodies 1 and 2 fold, the first and second bodies 1 and 2 may move away from the first and second hinge shafts 5a-1 and 5a-2. As the third part 4c of the flexible display device 4 forms the curved portion 4d and is received in the receiving space 3 in the first and second bodies 1 and 2, the first and second bodies 1 and 2 may move toward the first and second hinge shafts 5a-1 and 5a-2. When the first and second bodies 1 and 2 unfold, the first and second bodies 1 and 2 may move away from the first and second hinge shafts 5a-1 and 5a-2. As the curved portion 4d of the third part 4c of the flexible display device 4 unfolds and is separated from the receiving space 3 in the first and second bodies 1 and 2, the first and second bodies 1 and 2 may move again toward the first and second hinge shafts 5a-1 and 5a-2. Accordingly, in order to compensate for the folding/unfolding path difference 4g during the folding/unfolding process, the foldable device may include a path difference compensating unit that restricts an amount of movement of the first and second bodies 1 and 2 to or from the first and second hinge shafts 5a-1 and 5a-2. The path difference compensating unit may enable at least one of the first and second bodies 1 and 2 to move away from the first and second hinge shafts 5a-1 and 5a-2 during a period when the foldable device moves from the unfolding position to a changing position. The path difference compensating unit may enable at least one of the first and second bodies 1 and 2 to move toward the first and second hinge shafts 5a-1 and 5a-2 during a period when the foldable device moves from the changing position to the folding position. The changing position may be the same as a receiving start position of first and second support portions 1b and 2b which will be explained below. In other words, an opening angle between the first and second bodies 1 and 2 at the changing position may be equal to or less than an opening angle between the first and second bodies 1 and 2 at the receiving start position. The path difference compensating unit will be explained below in detail.

Referring to FIGS. 2 and 3, the first and second support portions 1b and 2b that partially support the third part 4c of the flexible display device 4 at the unfolding position may be respectively provided on the first and second bodies 1 and 2. When the first and second bodies 1 and 2 are located at the folding position, the first and second support portions 1b and 2b pivot to a position at which the receiving space 3 in which the curved portion 4d is received is formed in the first and second bodies 1 and 2. In this configuration, the flexible display device 4 may be supported flat at the unfolding position, and may be received with a compact size in the first and second bodies 1 and 2 at the folding position.

The first and second support portions 1b and 2b may be maintained at a support position (see FIG. 2) at which the first and second support portions 1b and 2b partially support the third part 4c of the flexible display device 4 when an angle between the first and second bodies 1 and 2 ranges from 180° to a receiving start angle (of the receiving start position), and may pivot to a receiving position (see FIG. 3) at which the receiving space 3 is formed when the angle between the first and second bodies 1 and 2 is less than the receiving start angle. Since the foldable device is rarely used when the angle between the first and second bodies 1 and 2 is less than 90°, the receiving start angle may be, for example, about 90°. However, the present exemplary embodiment is not limited thereto, and the receiving start angle may be slightly greater or less than 90°. In order to stably support the flexible display device 4 at an inclined position which will be explained below, the receiving start angle may be equal to or less than an opening angle at the inclined position.

Figure 6:
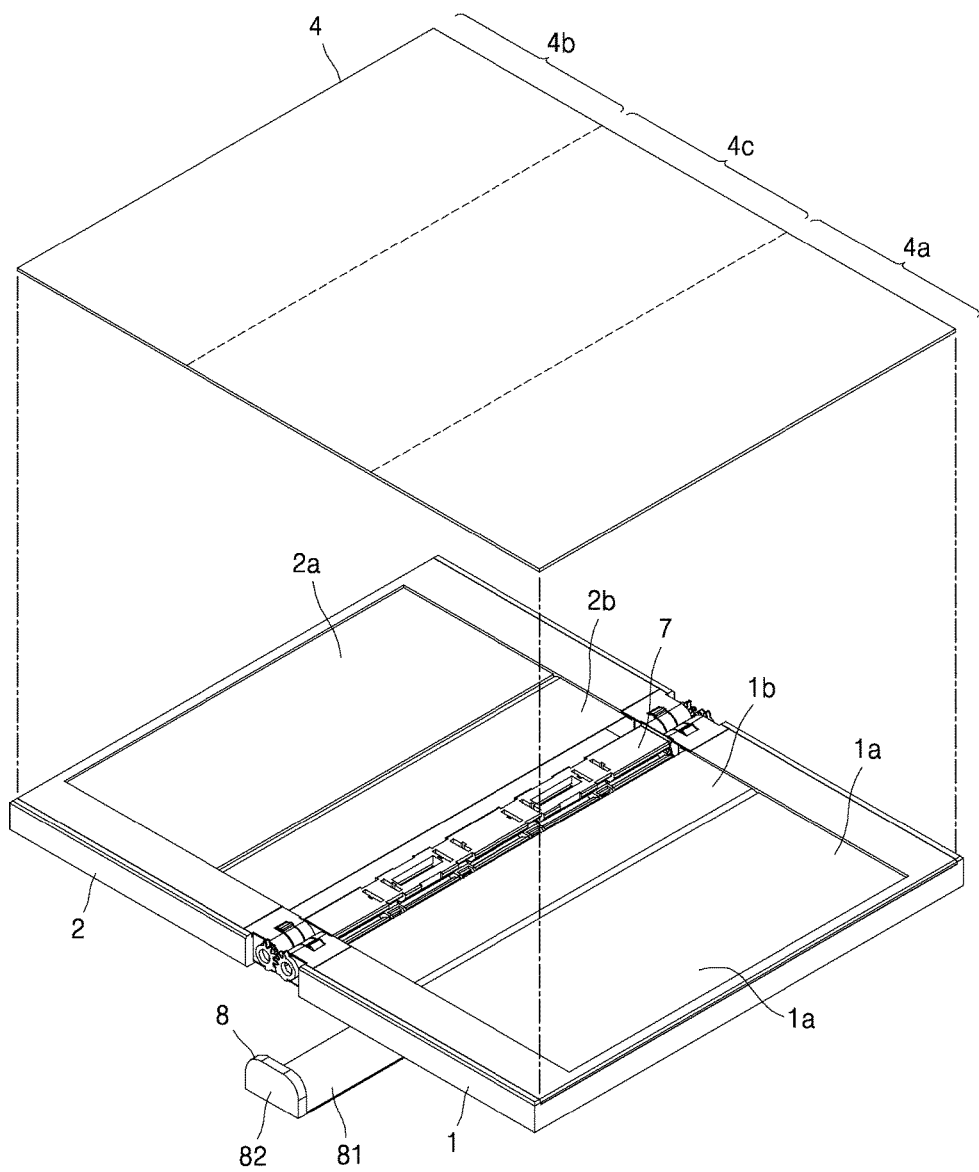
FIG. 6 is a schematic exploded perspective view of the foldable device according to an exemplary embodiment.
Figure 7:
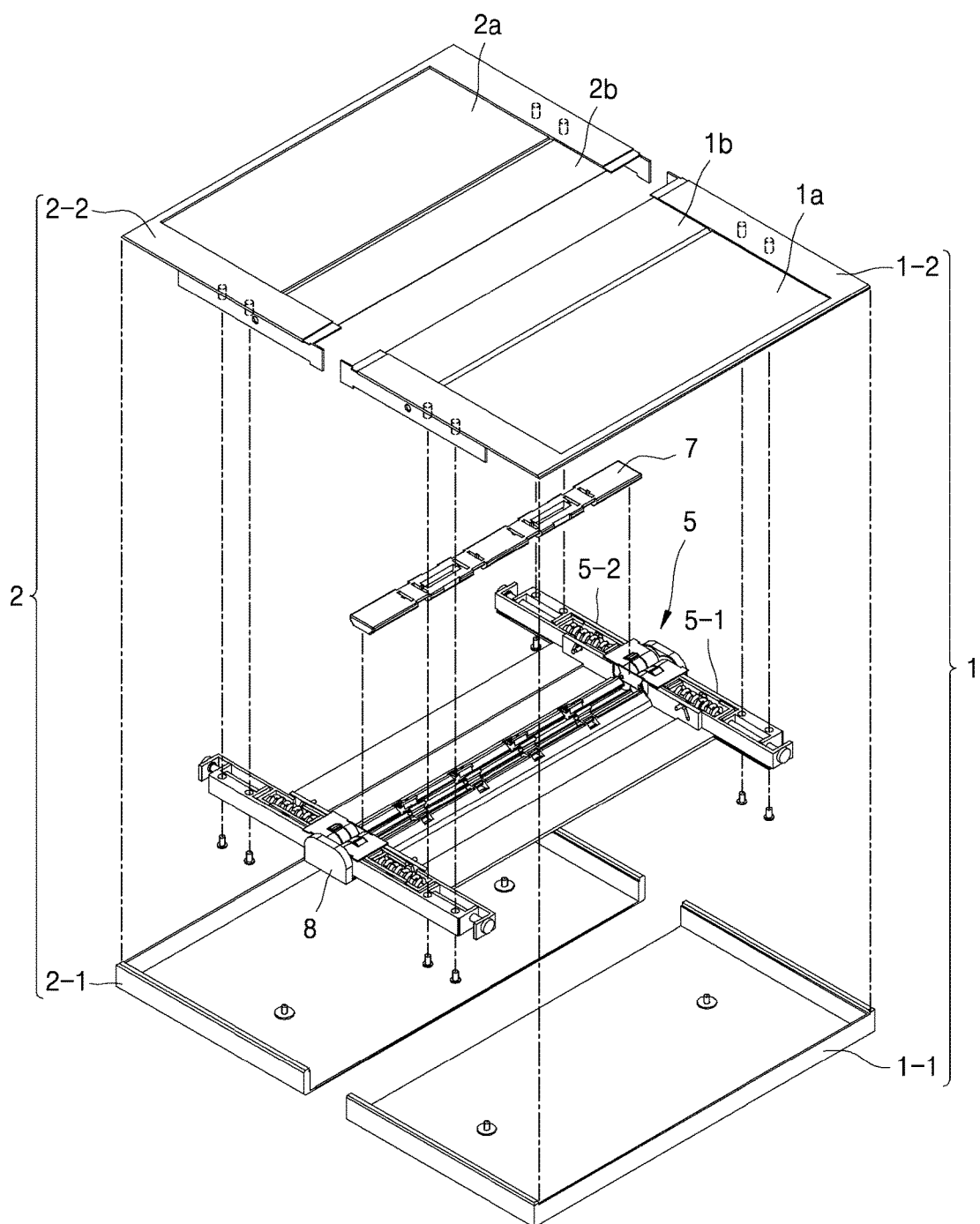
FIG. 7 is an exploded perspective view of the foldable device of FIG. 6 according to an exemplary embodiment.
Figure 8:
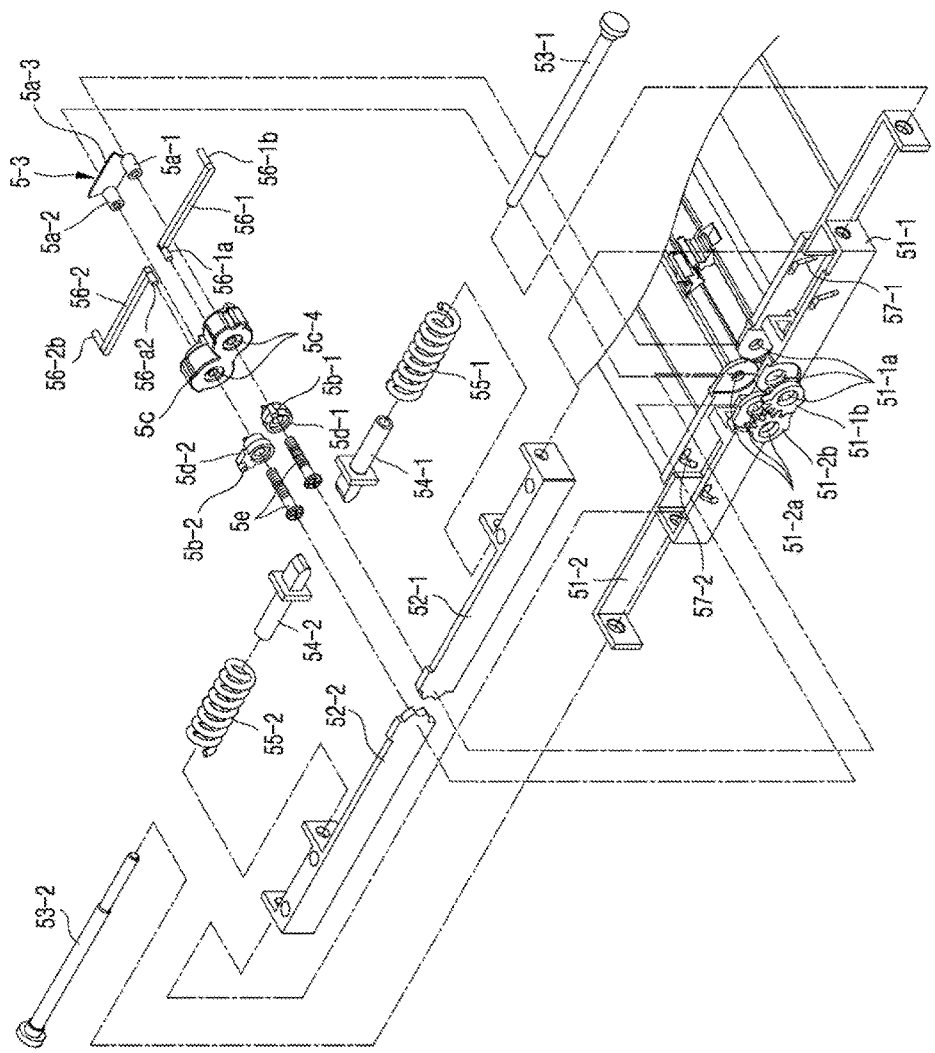
FIG. 8 is an exploded perspective view of a hinge unit according to an exemplary embodiment.

FIG. 6 is a schematic exploded perspective view of the foldable device according to an exemplary embodiment. FIG. 7 is an exploded perspective view of the foldable device of FIG. 6 according to an exemplary embodiment. FIG. 8 is an exploded perspective view of the hinge unit 5 according to an exemplary embodiment. Since the hinge unit 5 is symmetric in a width direction W of the foldable device, only one side of the hinge unit 5 in the width direction W is illustrated in FIG. 8.

Referring to FIGS. 6, 7, and 8, the hinge unit 5 includes a fixed hinge 5-3 including the first and second hinge shafts 5a-1 and 5a-2. The fixed hinge 5-3 is located at a fixed position without rotating or moving, The first and second bodies 1 and 2 may move to or from the fixed hinge 5-3 and may rotate around the fixed hinge 5-3. The hinge unit 5 may further include a first hinge unit 5-1 that pivots about the first hinge shaft 5a-1 and a second hinge unit 5-2 that pivots about the second hinge shaft 5a-2. The fixed hinge 5-3 includes the first and second hinge shafts 5a-1 and 5a-2. The fixed hinge 5-3 may further include a shielding plate 5a-3. The first and second hinge shafts 5a-1 and 5a-2 may be supported on the shielding plate 5a-3. The first and second hinge shafts 5a-1 and 5a-2 may be integrally formed with the shielding plate 5a-3. The shielding plate 5a-3 is located on a side portion of the flexible display device 4 in the width direction W and covers a gap between an end portion of the flexible display device 4 in the width direction W and the first and second bodies 1 and 2. Accordingly, the inside of the foldable device may be prevented from being exposed through the gap and foreign materials may be prevented from being introduced into the foldable device through the gap.

The first body 1 is connected to the first hinge unit 5-1 and the second body 2 is connected to the second hinge unit 5-2. The first body 1 includes a first lower case 1-1 and a first upper case 1-2. The first upper case 1-2 includes the first fixed portion 1a and the first support portion 1b. The first support portion 1b is coupled to the first upper case 1-2 so that the first support portion 1b pivots between the support position and the receiving position. The second body 2 includes a second lower case 2-1 and a second upper case 2-2. The second upper case 2-2 includes the second fixed portion 2a and the second support portion 2b. The second support portion 2b is coupled to the second upper case 2-2 so that the second support portion 2b pivots between the support position and the receiving position.

Referring to FIG. 8, the first hinge unit 5-1 includes a first hinge frame 51-1. The first hinge shaft 5a-1 is inserted into first through-holes 51-1a that are formed in the first hinge frame 51-1. A diameter of each of the first through-holes 51-1a is determined so that the first hinge frame 51-1 pivots about the first hinge shaft 5a-1. Accordingly, the first hinge frame 51-1 may pivot about the first hinge shaft 5a-1.

A first movable frame 52-1 is supported on the first hinge frame 51-1 so that the first movable frame 52-1 moves to or from the first hinge shaft 5a-1. For example, a first guide shaft 53-1 that extends in the longitudinal direction L is provided on the first hinge frame 51-1, and the first movable frame 52-1 is slidably supported on the first guide shaft 53-1. The first lower case 1-1 and the first upper case 1-2 may be coupled to the first movable frame 52-1 to be respectively disposed under and over the first movable frame 52-1. According to another exemplary embodiment, one of the first lower case 1-1 and the first upper case 1-2 may be coupled to the first movable frame 52-1 and the other case. The first body 1 is connected to the first hinge unit 5-1 so that the first body 1 moves to or from the first hinge shaft 5a-1.

The second hinge unit 5-2 includes a second hinge frame 51-2. The second hinge shaft 5a-2 is inserted into second through-holes 51-2a that are formed in the second hinge frame 51-2. A diameter of each of the second through-holes 51-2a is determined so that the second hinge frame 51-2 pivots about the second hinge shat 5a-2. Accordingly, the second hinge frame 51-2 may pivot about the second hinge shaft 5a-2.

A second movable frame 52-2 is supported on the second hinge frame 51-2 so that the second movable frame 52-2 moves to or from the second hinge shaft 5a-2. For example, a second guide shaft 53-2 that extends in the longitudinal direction L is provided on the second hinge frame 51-2, and the second movable frame 52-2 is slidably supported on the second guide shaft 53-2. The second lower case 2-1 and the second upper case 2-2 may be coupled to the second movable frame 52-2 to be respectively disposed under and over the second movable frame 52-2. Accordingly to another exemplary embodiment, one of the second lower case 2-1 and the second upper case 2-2 may be coupled to the second movable frame 52-2 and the other case. The second body 2 is connected to the second hinge unit 5-2 so that the second body 2 moves to or from the second hinge shaft 5a-2.

First and second gear portions 51-1b and 51-2b having at the center the first and second through-holes 51-1a and 51-2a are respectively provided on the first and second hinge frames 51-1 and 51-2. The first and second gear portions 51-1b and 51-2b are engaged with each other. In this configuration, the first and second bodies 1 and 2 may synchronously rotate about the first and second hinge shafts 5a-1 and 5a-2.

The foldable device may include a locking unit that locks the first and second bodies 1 and 2 at any of a plurality of positions. For example, the locking unit may lock the first and second bodies 1 and 2 at the unfolding position (see FIG. 2) and at the folding position (see FIG. 3). The locking unit may further lock the first and second bodies 1 and 2 at a position (inclined position) having a predetermined opening angle between the unfolding position (see FIG. 2) and the folding position (see FIG. 3). The opening angle at the inclined position may be greater than 90°. The locking unit may lock the first and second bodies 1 and 2 at any of a plurality of inclined positions having an opening angle between 180° and 90°. An opening angle of an inclined position may be, for example, 120°.

Figure 9:
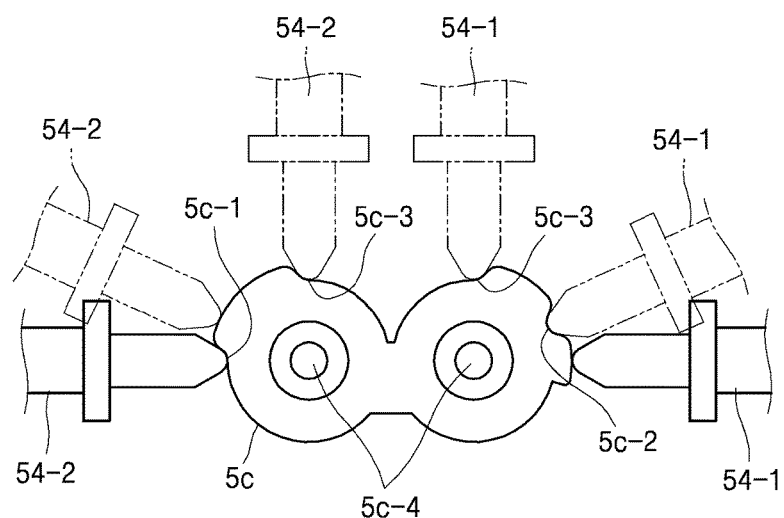
FIG. 9 is a side view for explaining an operation of a locking unit.

FIG. 8 illustrates the locking unit according to an exemplary embodiment. FIG. 9 is a side view for explaining an operation of the locking unit. Referring to FIGS. 8 and 9, the locking unit may include a locking member 5c that is located at a fixed position, and a protrusion member that is fixed by the locking member 5c while rotating along with the first and second bodies 1 and 2. The locking member 5c may include locking portions 5c-1, 5c-2, and 5c-3 that respectively lock the first and second bodies 1 and 2 at the unfolding position, the inclined position, and the folding position. The protrusion member may include first and second protrusion members 54-1 and 54-2 that are selectively fixed by the locking portions 5c-1, 5c-2, and 5c-3 according to an opening angle between the first and second bodies 1 and 2.

The locking member 5c is located at the fixed position. The locking member 5c is provided on the fixed hinge 5-3. The locking member 5c may be fixed to the first and second hinge shafts 5a-1 and 5a-2. In the present exemplary embodiment, the first and second hinge shafts 5a-1 and 5a-2 pass through through-holes 5c-4 that are formed in the locking member 5c. Accordingly, the locking member 5c has the fixed position with respect to the first and second hinge shafts 5a-1 and 5a-2.

The first and second protrusion members 54-1 and 54-2 rotate about the first and second hinge shafts 5a-1 and 5a-2 along with the first and second bodies 1 and 2. The first and second protrusion members 54-1 and 54-2 are supported on the first and second hinge frames 51-1 and 51-2 so that the first and second protrusion members 54-1 and 54-2 move toward or away from the locking member 5c. First and second elastic members 55-1 and 55-2 apply elastic forces to the first and second protrusion members 54-1 and 54-2 to hold the movement of the first and second protrusion members 54-1 and 54-2 at the locking portions 5c-1, 5c-2, and 5c-3. In the present exemplary embodiment, the first and second protrusion members 54-1 and 54-2 are fixed to the first and second guide shafts 53-1 and 53-2. The first and second guide shafts 53-1 and 53-2 are supported on the first and second hinge frames 51-1 and 51-2 so that the first and second guide shafts 53-1 and 53-2 slide toward or away from the locking member 5c.

Since the first and second bodies 1 and 2 synchronously rotate due to the first and second gear portions 51-2a and 51-2b in the present exemplary embodiment, only one of the first and second bodies 1 and 2 may need to be locked. Accordingly, once one of the first and second protrusion members 54-1 and 54-2 is fixed by the locking portions 5c-1, 5c-2, and 5c-3, the first and second bodies 1 and 2 may be locked not to rotate.

Referring to FIG. 9, when the first and second bodies 1 and 2 are located at the unfolding position, the second protrusion member 54-2 is fixed or locked by the locking portion 5c-1. Since the first and second bodies 1 and 2 synchronously rotate due to the first and second gear portions 51-2a and 51-2b as described above, once the second body 2 is locked at the unfolding position, the first body 1 is also locked at the unfolding position.

When the first and second bodies 1 and 2 begin to fold, the second protrusion member 54-2 is pushed in a direction that is opposite to a direction in which an elastic force of the second elastic member 55-2 is applied and thus is separated from the locking portion 5c-1. When the first and second bodies 1 and 2 reach the inclined position, for example, a position having an opening angle of 120°, the first protrusion member 54-1 is fixed by the locking portion 5c-2. Accordingly, the first and second bodies 1 and 2 are locked at the inclined position.

When the first and second bodies 1 and 2 continuously move to be folded, the first protrusion member 54-1 is pushed in a direction that is opposite to a direction in which an elastic force of the first elastic member 55-1 is applied and thus is separated from the locking portion 5c-2. When the first and second bodies 1 and 2 reach the folding position, the movement of the first and second protrusion members 54-1 and 54-2 are stopped and locked by one pair of locking portions 5c-3. Accordingly, the first and second bodies 1 and 2 are locked at the folding position.

As such, since the foldable device may be locked at the unfolding position and the folding position, convenience in use and portability may be improved. Also, since the foldable device may be located at a predetermined inclination angle, convenience in use may be further improved. Although the locking member 5c including one locking portion 5c-2 corresponding to an inclination angle is provided in the present exemplary embodiment, two or more locking portions 5c-2 corresponding to two or more inclination angles may be provided, and thus the foldable device may be located at positions having the two or more inclination angles.

As described above, amounts of movement of the first and second bodies 1 and 2 to or from a hinge shaft, for example, the first and second hinge shafts 5a-1 and 5a-2 are restricted during a folding/unfolding process in order to compensate for the folding/unfolding path difference 4g. To this end, the foldable device includes the path difference compensating unit. The path difference compensating unit enables at least one of the first and second bodies 1 and 2 to move away from the hinge shaft during a period when the foldable device moves from the unfolding position to the changing position. The path difference compensating unit enables at least one of the first and second bodies 1 and 2 to move toward the hinge shaft during a period when the foldable device moves from the changing position to the folding position.

For example, the path difference compensating unit may include a restriction pin that has a fixed position with respect to the first and second hinge shafts 5a-1 and 5a-2 and a restriction slot that rotates about and moves to or from the first and second hinge shafts 5a-1 and 5a-2 along with the first and second bodies 1 and 2. The restriction pin stays fixed and does not rotate around the first and second hinge shafts 5a-1 and 5a-2. The restriction slot is shaped to restrict amounts of movement of the first and second bodies 1 and 2 according to a rotation angle of the first and second bodies 1 and 2.

Figure 10A:
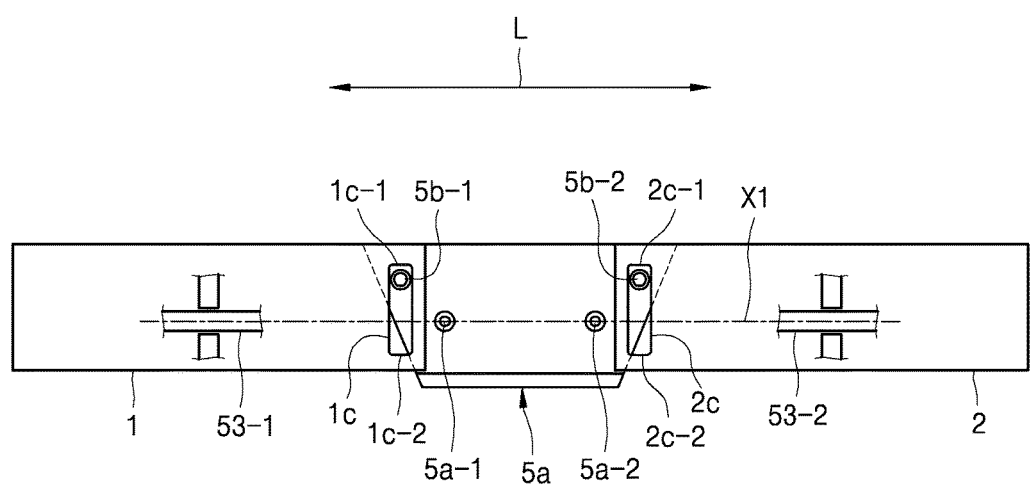
FIGS. 10A, 10B, and 10C are schematic views of a structure in which first and second bodies move to or from first and second hinge shafts according to an exemplary embodiment, respectively illustrating a state wherein the first and second bodies are unfolded, a state wherein the first and second bodies are spaced apart by a maximum distance from the first and second hinge shafts, and a state wherein the first and second bodies are folded.
Figure 10B:
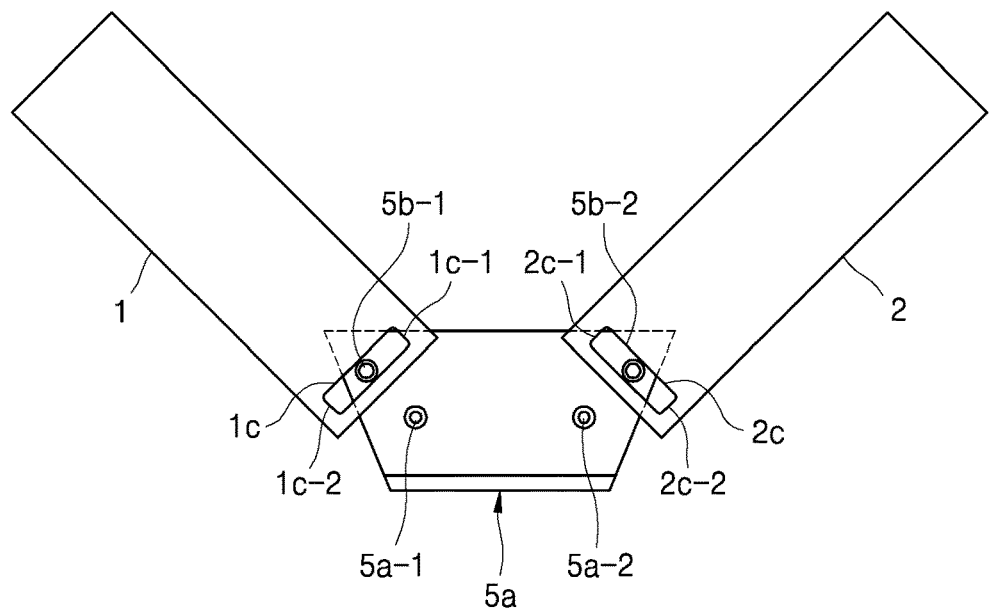
Figure 10C:
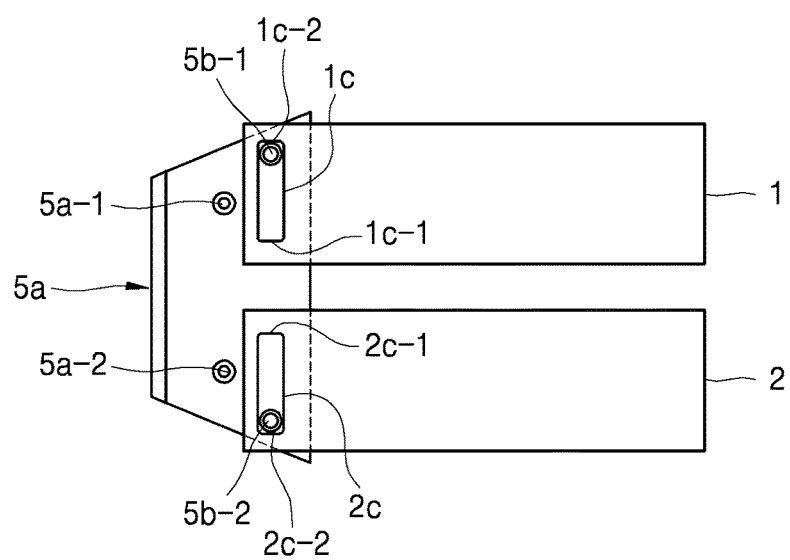
Figure 10D:
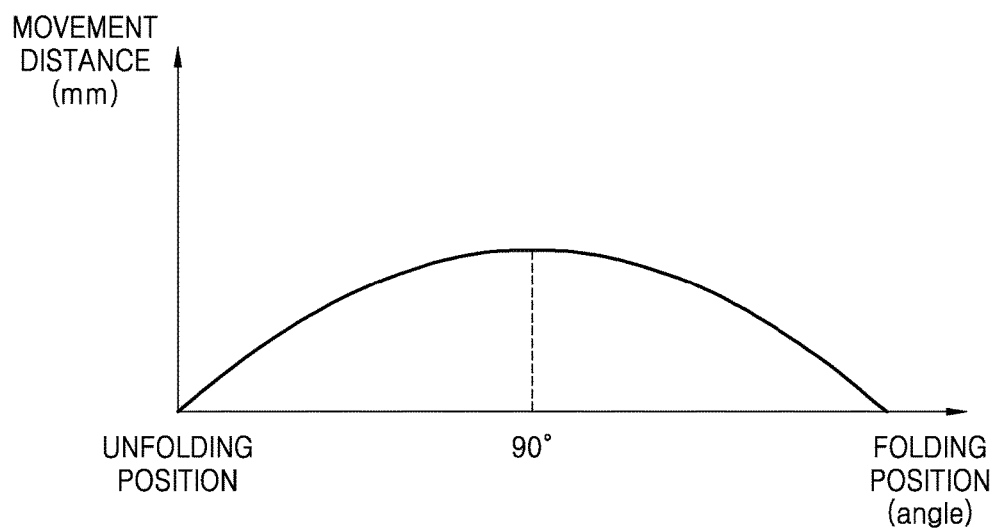
FIG. 10D is a graph showing a movement distance according to a folding angle between the first and second bodies in the structure of FIG. 10A.

FIGS. 10A, 10B, and 10C are schematic views of a structure of a hinge shaft 5a including the first and second bodies 1 and 2 that move to or from the first and second hinge shafts 5a-1 and 5a-2 according to an exemplary embodiment. FIG. 10A illustrates a state wherein the first and second bodies 1 and 2 are unfolded, FIG. 10B illustrates a state wherein the first and second bodies 1 and 2 are spaced apart by a maximum distance from the first and second hinge shafts 5a-1 and 5a-2, and FIG. 10C illustrates a state wherein the first and second bodies 1 and 2 are folded. In the foldable device according to the present exemplary embodiment, the first and second bodies 1 and 2 move to or from the first and second hinge shafts 5a-1 and 5a-2. In FIGS. 10A, 10B, and 10C, the flexible display device 4 is not shown. FIG. 10D is a graph showing a movement distance according to a folding angle between the first and second bodies 1 and 2.

Referring to FIG. 10A, the first and second bodies 1 and 2 may move along the first and second guide shafts 53-1 and 53-2 as described above. Amounts of movement of the first and second bodies 1 and 2 are restricted by the path difference compensating unit. The path difference compensating unit may include first and second restriction pins 5b-1 and 5b-2 having fixed positions, and first and second restriction slots 1c and 2c that rotate and move along with the first and second bodies 1 and 2. For example, the first and second restriction slots 1c and 2c may be formed in the first and second bodies 1 and 2 or the first and second movable frames 52-1 and 52-2 (see FIG. 8). The first and second restriction pins 5b-1 and 5b-2 are respectively inserted into the first and second restriction slots 1c and 2c. The first and second restriction slots 1c and 2c respectively include first end portions 1c-1 and 2c-1 and second end portions 1c-2 and 2c-2. At the unfolding position, the first and second restriction pins 5b-1 and 5b-2 are respectively located in the first end portions 1c-1 and 2c-1, and at the folding position, the first and second restriction pins 5b-1 and 5b-2 are respectively located in the second end portions 1c-2 and 2c-2. As shown in FIG. 10A, each of the first and second restriction slots 1c and 2c linearly extends in a direction that is perpendicular to the longitudinal direction L of the first and second bodies 1 and 2, and is symmetric with respect to a line X1 that connects the first and second hinge shafts 5a-1 and 5a-2. In this configuration, a movement distance of the first and second bodies 1 and 2 to or from the first and second hinge shafts 5a-1 and 5a-2 when the first and second bodies 1 and 2 fold/unfold is symmetric about an angle of 90° as shown in the graph of FIG. 10D.

When the first and second bodies 1 and 2 are completely unfolded as shown in FIG. 10A, the folding/unfolding path difference 4g between the flexible display device 4 and the first and second bodies 1 and 2 is "0" and the first and second restriction pins 5b-1 and 5b-2 are located in the first end portions 1c-2 and 2c-2 of the first and second restriction slots 1c and 2c. In this state, when the first and second bodies 1 and 2 begin to pivot about the first and second hinge shafts 5a-1 and 5a-2 to fold, the first and second bodies 1 and 2 are guided by the first and second restriction pins 5b-1 and 5b-2 and the first and second restriction slots 1c and 2c to gradually move away from the first and second hinge shafts 5a-1 and 5a-2. When the first and second bodies 1 and 2 form an angle of, for example, 90°, therebetween as shown in FIG. 10B, the first and second restriction pins 5b-1 and 5b-2 are located in the middle of the first and second restriction slots 1c and 2c and the first and second bodies 1 and 2 reach a farthest position from the first and second hinge shafts 5a-1 and 5a-2. When the first and second bodies 1 and 2 move continuously to be folded, the first and second bodies 1 and 2 gradually move toward the first and second hinge shafts 5a-1 and 5a-2. When the first and second bodies 1 and 2 are completely folded as shown in FIG. 10C, the first and second restriction pins 5b-1 and 5b-2 reach the second end portions 1c-2 and 2c-2 of the first and second restriction slots 1c and 2c.

As such, since the first and second bodies 1 and 2 move away from the first and second hinge shafts 5a-1 and 5a-2 and then move toward the first and second hinge shafts 5a-1 and 5a-2 during a folding/unfolding process to compensate for the folding/unfolding path difference 4g, the third part 4c of the flexible display device 4 may be bent into a smooth curved shape. Also, when the foldable device is used in a state wherein the first and second bodies 1 and 2 form a predetermined unfolding angle therebetween, the third part 4c has a smooth curved shape, thereby reducing distortion of a screen.

The first and second restriction slots 1c and 2c are not limited to linear shapes of FIG. 10A, and may have any of various shapes as long as the folding/unfolding path difference 4g according to a folding/unfolding structure of the first and second bodies 1 and 2 may be compensated for.

Figure 11A:
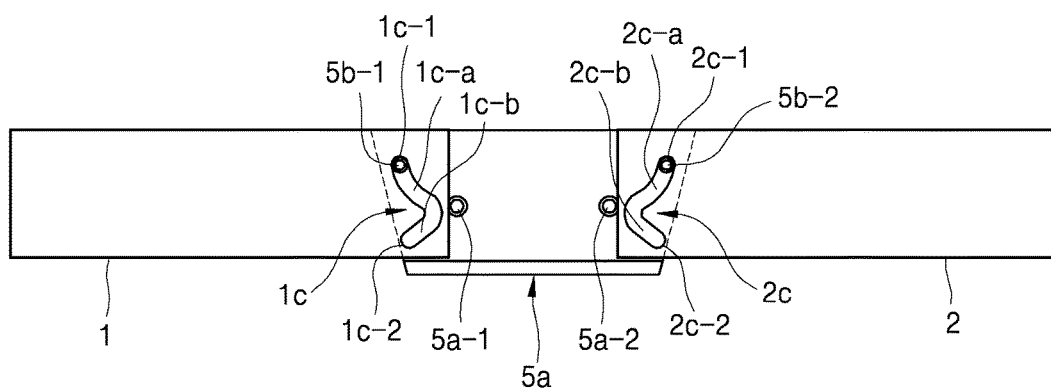
FIGS. 11A, 11B, and 11C are schematic views of a structure in which the first and second bodies move to or from the first and second hinge shafts according to an exemplary embodiment, respectively illustrating a state wherein the first and second bodies are unfolded, a state wherein the first and second bodies are spaced apart by a maximum distance from the first and second hinge shafts, and a state wherein the first and second bodies are folded.
Figure 11B:
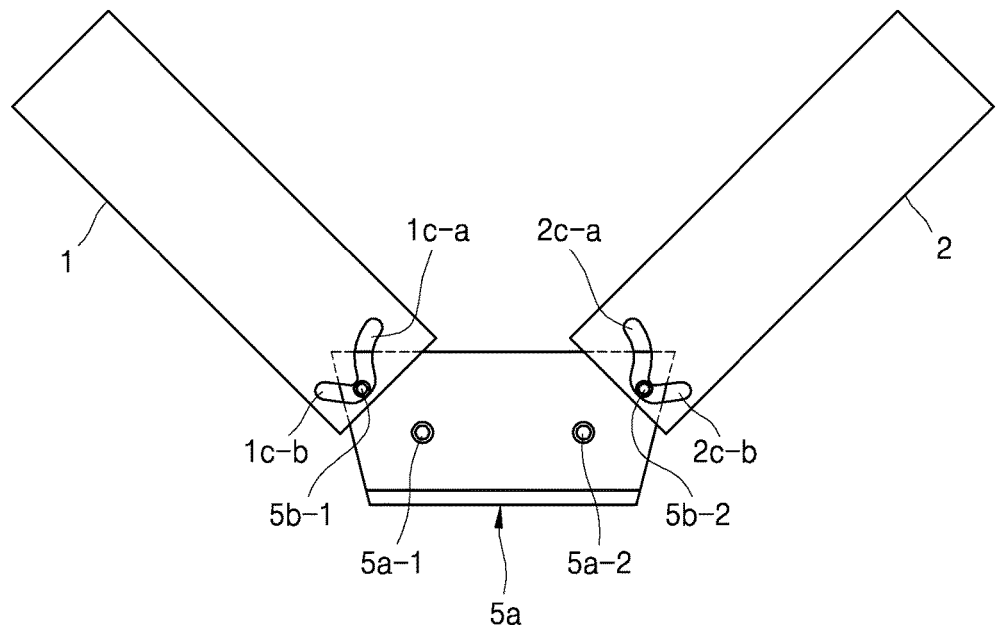
Figure 11C:
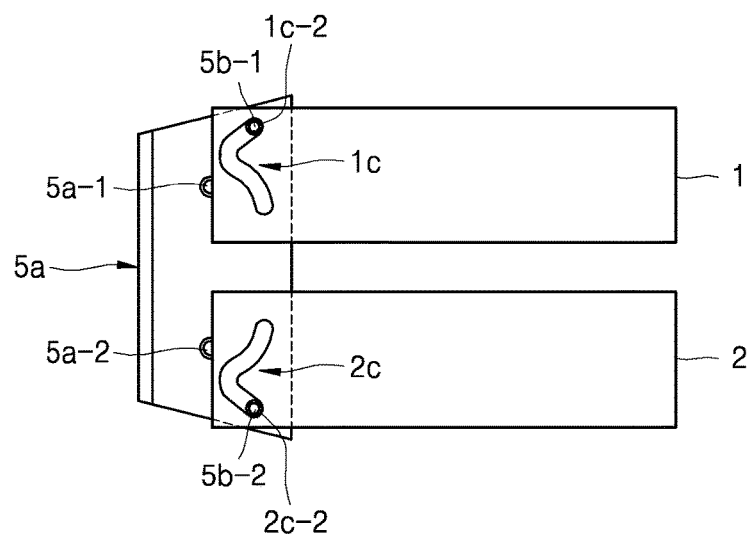
Figure 11D:
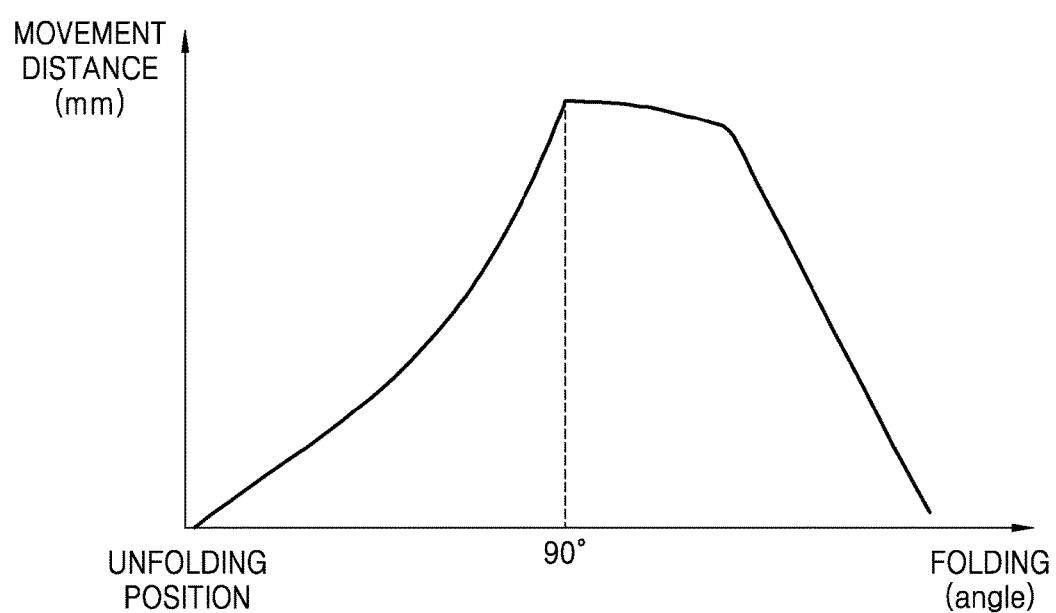
FIG. 11D is a graph showing a movement distance according to a folding angle between the first and second bodies in the structure of FIG. 11A.

FIGS. 11A, 11B, and 11C are schematic views of a structure of a hinge shaft 5a including the first and second bodies 1 and 2 that move to or from the first and second hinge shafts 5a-1 and 5a-2 according to an exemplary embodiment. FIG. 11A illustrates a state wherein the first and second bodies 1 and 2 are unfolded, FIG. 11B illustrates a state wherein the first and second bodies 1 and 2 are spaced apart by a maximum distance from the first and second hinge shafts 5a-1 and 5a-2, and FIG. 11C illustrates a state wherein the first and second bodies 1 and 2 are folded. In FIGS. 11A, 11B, and 11C, the flexible display device 4 is not shown. FIG. 11D is a graph showing a movement distance according to a folding angle between the first and second bodies 1 and 2.

Referring to FIG. 11A, the first and second restriction slots 1c and 2c include first parts 1c-a and 2c-a corresponding to a folding/unfolding process from an unfolding state to a state having an angle of, for example, 90°, between the first and second bodies 1 and 2 and second parts 1c-b and 2c-b corresponding to a folding/unfolding process from the state having the angle of 90° between the first and second bodies 1 and 2 and a folding state. The first and second bodies 1 and 2 are folded or unfolded by rotating about the first and second hinge shafts 5a-1 and 5a-2. When the first and second bodies 1 and 2 are folded, the first and second bodies 1 and 2 form an obtuse angle during a period when the foldable device moves from the unfolding state to a state having the receiving start angle of, for example, 90°, and the first and second support portions 1b and 2b are maintained at the support position. As a result, the folding/unfolding path difference 4g may be sharply increased. When the angle between the first and second bodies 1 and 2 is less than the receiving start angle, the first and second support portions 1b and 2b may pivot to the receiving position at which the receiving space 3 is formed, thereby reducing the folding/unfolding path difference 4g to some extent due to the receiving space 3.

In this regard, the first parts 1c-a and 2c-a have profiles corresponding to a sharp change in the folding/unfolding path difference 4g during a folding/unfolding process. When the angle between the first and second bodies 1 and 2 is less than 90°, since the third part 4c of the flexible display device 4 is received in the receiving space 3 and thus the folding/unfolding path difference 4g is reduced to some extent due to the receiving space 3, the second parts 1c-b and 2c-b do not need to have strict profiles for compensating for the folding/unfolding path difference 4g when compared to the first parts 1c-a and 2c-a. The second parts 1c-b and 2c-b may just have profiles for moving the first and second bodies 1 and 2 so that the third part 4c of the flexible display device 4 smoothly forms the curved portion 4d and is received in the receiving space 3.

According to the first and second restriction slots 1c and 2c of FIG. 11A, a movement distance of the first and second bodies 1 and 2 to or from the first and second hinge shafts 5a-1 and 5a-2 when the first and second bodies 1 and 2 fold or unfold is asymmetric about an angle of 90° as shown in the graph of FIG. 11D. That is, a change in a movement distance when the first and second bodies 1 and 2 are guided by the first parts 1c-a and 2c-a, that is, a gradient of a curve indicating the movement distance in FIG. 11D, is sharply increased, and a movement distance when the first and second bodies 1 and 2 are guided by the second parts 1c-b and 2c-b is relatively moderately changed.

When the first and second bodies 1 and 2 are completely unfolded as shown in FIG. 11A, the folding/unfolding path difference 4g between the flexible display device 4 and the first and second bodies 1 and 2 is "0" and the first and second restriction pins 5b-1 and 5b-2 are located in the first end portions 1c-2 and 2c-1 of the first and second restriction slots 1c and 2c. In this state, when the first and second bodies 1 and 2 begin to pivot about the first and second hinge shafts 5a-1 and 5a-2 to fold, due to operations of the first and second restriction pins 5b-1 and 5b-2 and the first parts 1c-a and 2c-a, the first and second bodies 1 and 2 rapidly move away from the first and second hinge shafts 5a-1 and 5a-2. When the first and second bodies 1 and 2 form an angle of 90° therebetween as shown in FIG. 11B, the first and second restriction pins 5b-1 and 5b-2 are located in the middle of the first and second restriction slots 1c and 2c, that is, a boundary between the first parts 1c-a and 2c-a and the second parts 1c-b and 2c-b, and the first and second bodies 1 and 2 reach a farthest position from the first and second hinge shafts 5a-1 and 5a-2. When the first and second bodies 1 and 2 move continuously to folded, the first and second restriction pins 5b-1 and 5b-2 are guided by the second parts 1c-b and 2c-b, and the first and second bodies 1 and 2 gradually move toward the first and second hinge shafts 5a-1 and 5a-2. When the first and second bodies 1 and 2 are completely folded as shown in FIG. 11C, the first and second restriction pins 5b-1 and 5b-2 reach the second end portions 1c-2 and 2c-2 of the first and second restriction slots 1c and 2c.

In other exemplary embodiments, the first and second restriction slots 1c and 2c may have any of various shapes for compensating for the folding/unfolding path difference 4g between the flexible display device 4 and the first and second bodies 1 and 2 according to a folding/unfolding angle.

Figure 12A:
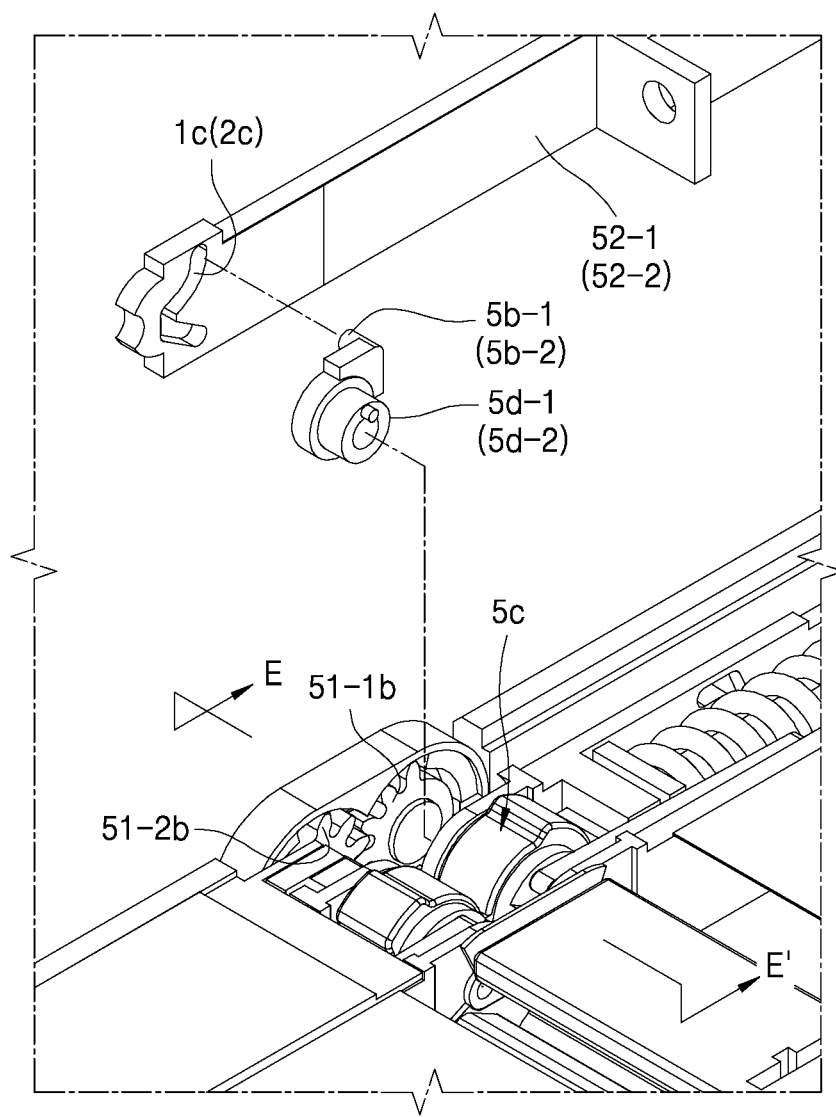
FIG. 12A is an exploded perspective view for explaining a connection relationship between a first restriction pin and a first restriction slot according to an exemplary embodiment.
Figure 12B:
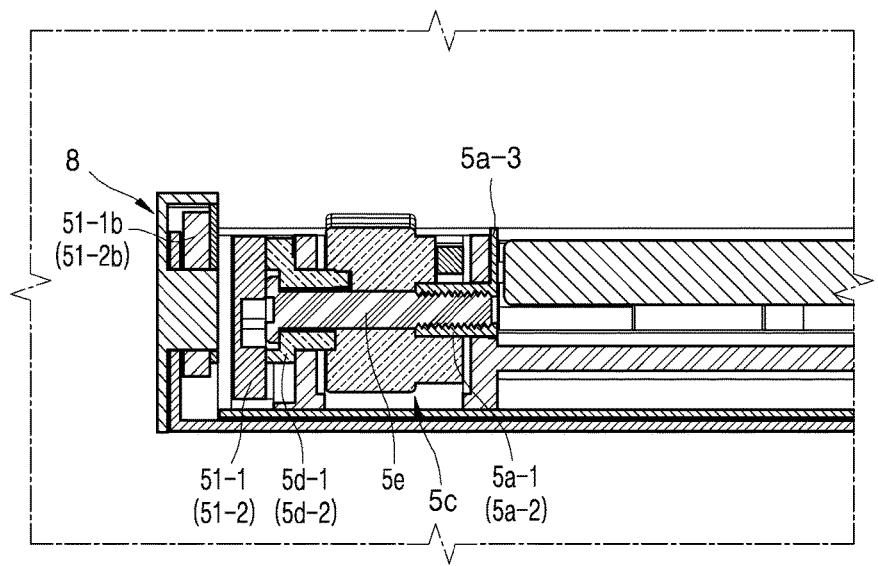
FIG. 12B is a cross-sectional view taken along line E-E' of FIG. 12A.

FIG. 12A is an exploded perspective view illustrating a connection relationship between the first restriction pin 5b-1 and the first restriction slot 1c according to an exemplary embodiment. FIG. 12B is a cross-sectional view taken along line E-E' of FIG. 12A. The path difference compensating unit will now be explained with reference to FIGS. 8, 12A, and 12B.

Referring to FIGS. 8, 12A, and 12B, first and second pin members 5d-1 and 5d-2 are illustrated. The first and second restriction pins 5b-1 and 5b-2 are respectively provided on the first and second pin members 5d-1 and 5d-2. The first and second pin members 5d-1 and 5d-2 are provided on the fixed hinge 5-3. For example, the first and second pin members 5d-1 and 5d-2 are inserted into through-holes 5c-4 of the locking member 5c and are respectively fixed to the first and second hinge shafts 5a-1 and 5a-2 due to a fastening member 5e. Accordingly, the first and second restriction pins 5b-1 and 5b-2 may have fixed positions with respect to the first and second hinge shafts 5a-1 and 5a-2.

The first restriction slot 1c including the first part 1c-a and the second part 1c-b shown in FIG. 11A is formed in an end portion of the first movable frame 52-1 that is close to the first hinge shaft 5a-1. The first restriction pin 5b-1 is inserted into the first restriction slot 1c. As marked by brackets in FIGS. 12A and 12B, the second restriction slot 2c including the first part 2c-a and the second part 2c-b shown in FIG. 11A is also formed in the second movable frame 52-2. The second restriction pin 5b-2 is inserted into the second restriction slot 2c.

The path difference compensating unit according to an exemplary embodiment may be realized by using the above configuration. Shapes of the first and second restriction slots 1c and 2c are not limited to those in the above, and may be determined to compensate for the folding/unfolding path difference 4g in consideration of the folding/unfolding path difference 4g during a folding/unfolding process of the first and second bodies 1 and 2.

The first and second support portions 1b and 2b may move between the support position and the receiving position as described above. The first and second support portions 1b and 2b are located at the support position when the first and second bodies 1 and 2 are located at the unfolding position, and move to the receiving position when the first and second bodies 1 and 2 are located at the folding position. In order for the first and second bodies 1 and 2 to be used at the inclined position between the unfolding position and the folding position, the first and second support portions 1b and 2b may be located at the support position when the first and second bodies 1 and 2 are in a position from the unfolding position to the inclined position, and may move to the receiving position when the first and second bodies 1 and 2 fold beyond the inclined position. Accordingly, the receiving start angle may be equal to or greater than an angle corresponding to the inclined position. Since the foldable device is rarely used at an opening angle that is less than 90°, the first and second support portions 1b and 2b may be maintained at the support position at the opening angle ranging from 180° to 90°.

The foldable device may include a restriction unit that maintains the first and second support portions 1b and 2b at the support position when the first and second bodies 1 and 2 are in a position from the unfolding position to the receiving start position corresponding to the receiving start angle, and allows the first and second support portions 1b and 2b to move to the receiving position when the first and second bodies 1 and 2 folds beyond the receiving start position.

Figure 13:
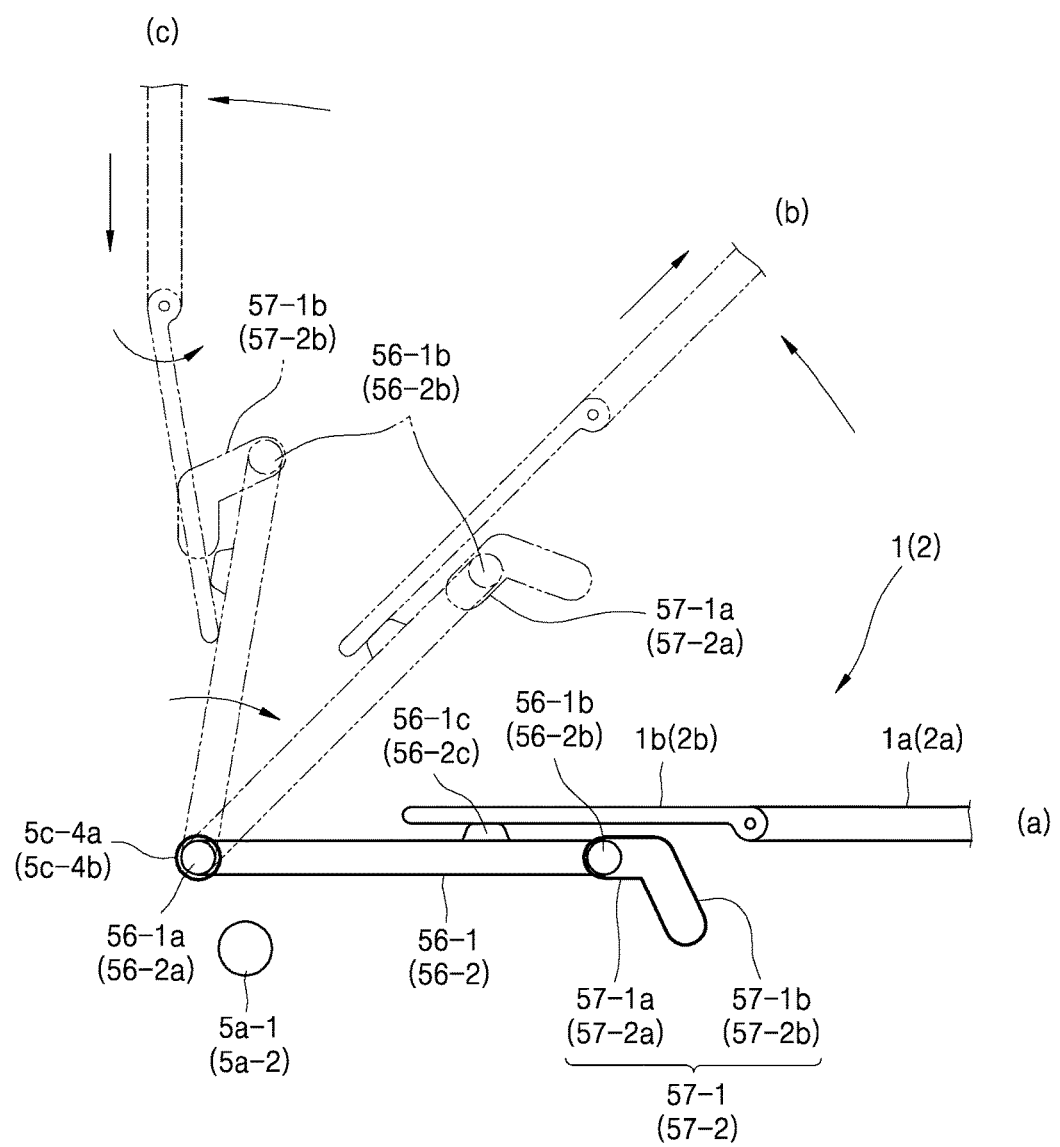
FIG. 13 is a schematic view of a restriction unit according to an exemplary embodiment.

FIG. 13 is a schematic view of the restriction unit according to an exemplary embodiment. Although only a mechanism that restricts the movement of the first support portion 1b is shown in FIG. 13, the same mechanism applies to a structure that restricts the movement of the second support portion 2b. Hence, reference numerals without parentheses in FIG. 13 denotes an element of the structure that restricts the movement of the first support portion 1b, and reference numerals in parentheses denotes an element of the structure that restricts the movement of the second support portion 2b.

Referring to FIG. 13, first and second support arms 56-1 and 56-2 that respectively support the first and second support portions 1b and 2b are illustrated. The first and second support arms 56-1 and 56-2 may respectively pivot about fixed positions with respect to the first and second hinge shafts 5a-1 and 5a-2. For example, the first and second support arms 56-1 and 56-2 may be pivotably supported on the fixed hinge 5-3.

Figure 14:
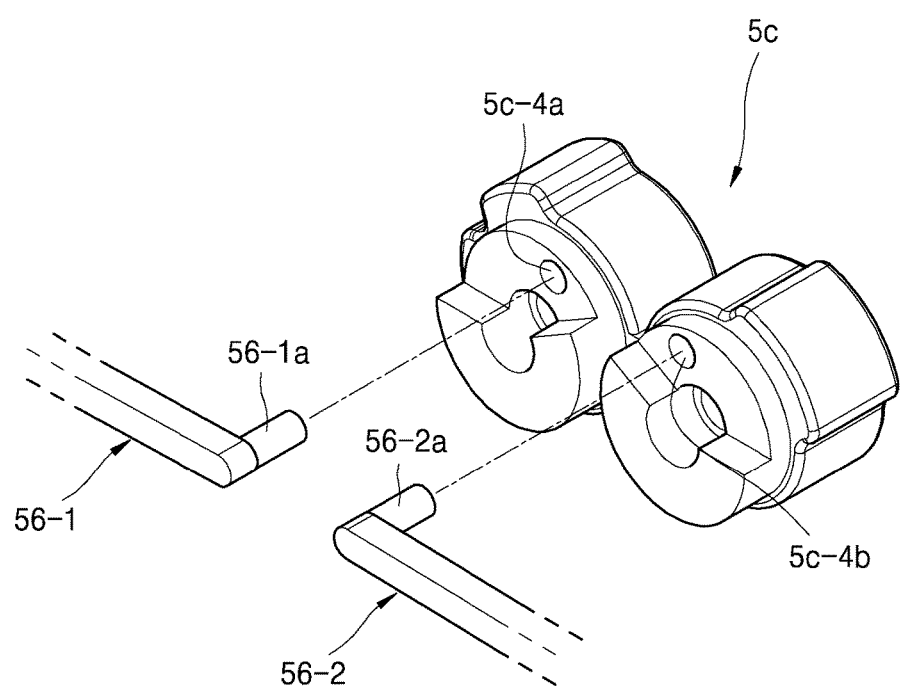
FIG. 14 is an exploded perspective view of a structure in which first and second support arms are pivotably supported according to an exemplary embodiment.

FIG. 14 is an exploded perspective view of a structure in which the first and second support arms 56-1 and 56-2 are pivotably supported according to an exemplary embodiment. Referring to FIGS. 8 and 14, first and second pivot pins 56-1a and 56-2a are respectively provided on end portions of the first and second support arms 56-1 and 56-2, and are respectively pivotably inserted into first and second pivot holes 5c-4a and 5c-4b that are formed in the locking member 5c.

First and second guide pins 56-1b and 56-2b are respectively provided on the first and second support arms 56-1 and 56-2. The first and second guide pins 56-1b and 56-2b are respectively inserted into first and second guide slots 57-1 and 57-2. Although the first and second guide pins 56-1b and 56-2b pass through the first and second guide slots 57-1 and 57-2, extend under the first and second support portions 1b and 2b, and support the first and second support portions 1b and 2b in the present exemplary embodiment, for convenience of explanation, FIG. 13 illustrates that support protrusions 56-1c and 56-2c that support the first and second support portions 1b and 2b are respectively provided on the first and second support arms 56-1 and 56-2.

The first and second guide slots 57-1 and 57-2 are respectively formed in the first and second hinge frames 51-1 and 51-2. The first and second guide slots 57-1 and 57-2 include support parts 57-1a and 57-2a and receiving parts 57-1b and 57-2b. The support parts 57-1a and 57-2a correspond to a period from the unfolding position to the receiving start position, and the receiving parts 57-1b and 57-2b correspond to a period from the receiving start position to the folding position. The support parts 57-1a and 57-2a are formed so that the first and second support arms 56-1 and 56-2 are maintained at a position at which the first and second support arms 56-1 and 56-2 support the first and second support portions 1b and 2b while the first and second bodies 1 and 2 pivot from the unfolding position to the receiving start position. The receiving parts 57-1b and 57-2b are formed so that the first and second support arms 56-1 and 56-2 are allowed to pivot away from the first and second support portions 1b and 2b and thus the first and second support portions 1b and 2b are allowed to pivot to the receiving position while the first and second bodies 1 and 2 pivot from the receiving start position to the folding position. Although the first and second support portions 1b and 2b pivot due to their weights from the support position to the receiving position in the present exemplary embodiment, an elastic member that applies an elastic force in a direction in which the first and second support portions 1b and 2b pivot to the receiving position may be provided, and thus the first and second support portions 1b and 2b may pivot from the support position to the receiving position due to the elastic force of the elastic member.

FIG. 13 illustrates a state (a) wherein the first and second bodies 1 and 2 are located at the unfolding position. The first and second guide pins 56-1b and 56-2b are located in the support parts 57-1a and 57-2a, and the first and second support portions 1b and 2b are supported by the first and second support arms 56-1 and 56-2 and are maintained at the support position. Accordingly, the flexible display device 4 is supported by the first and second fixed portions 1a and 2a, the first and second support portions 1b and 2b, and a movable guide member 7 which will be explained below and is maintained flat.

In the state (a) of FIG. 13, when the first and second bodies 1 and 2 begin to fold, the first and second bodies 1 and 2 move away from the first and second hinge shafts 5a-1 and 5a-2 due to the path difference compensating unit. Until the first and second bodies 1 and 2 reach the receiving start position as in a state (b) of FIG. 13, since the first and second guide pins 56-1b and 56-2b are guided by the support parts 57-1a and 57-2a, the first and second support arms 56-1 and 56-2 are maintained at a position at which the first and second support arms 56-1 and 56-2 support the first and second support portions 1b and 2b.

When the first and second bodies 1 and 2 fold beyond the receiving start position, the first and second guide pins 56-1b and 56-2b are guided by the receiving parts 57-1b and 57-2b. The first and second support arms 56-1 and 56-2 pivot about the first and second pivot pins 56-1a and 56-2a away from the first and second support portions 1b and 2b. The first and second support portions 1b and 2b pivot away from a rear surface of the flexible display device 4, and the receiving space 3 (see FIG. 3) begins to be formed in the first and second bodies 1 and 2. The first and second bodies 1 and 2 slide toward the first and second hinge shafts 5a-1 and 5a-2 due to the path difference compensating unit, and the third part 4c of the flexible display device 4 is moderately bent and is received in the receiving space 3.

When the first and second bodies 1 and 2 reach the folding position as in a state (c) of FIG. 13, the first and second support portions 1b and 2b reach the receiving position, and the receiving space 3 is formed in the first and second bodies 1 and 2 as shown in FIG. 3. The third part 4c of the flexible display device 4 forms the curved portion 4d and is received in the receiving space 3.

The first and second guide slots 57-1 and 57-2 are not limited to shapes in FIG. 13. Shapes of the first and second guide slots 57-1 and 57-2 may vary according to positions of the first and second pivot holes 5c-4a and 5c-4b relative to the first and second hinge shafts 5a-1 and 5a-2.

Figure 15:
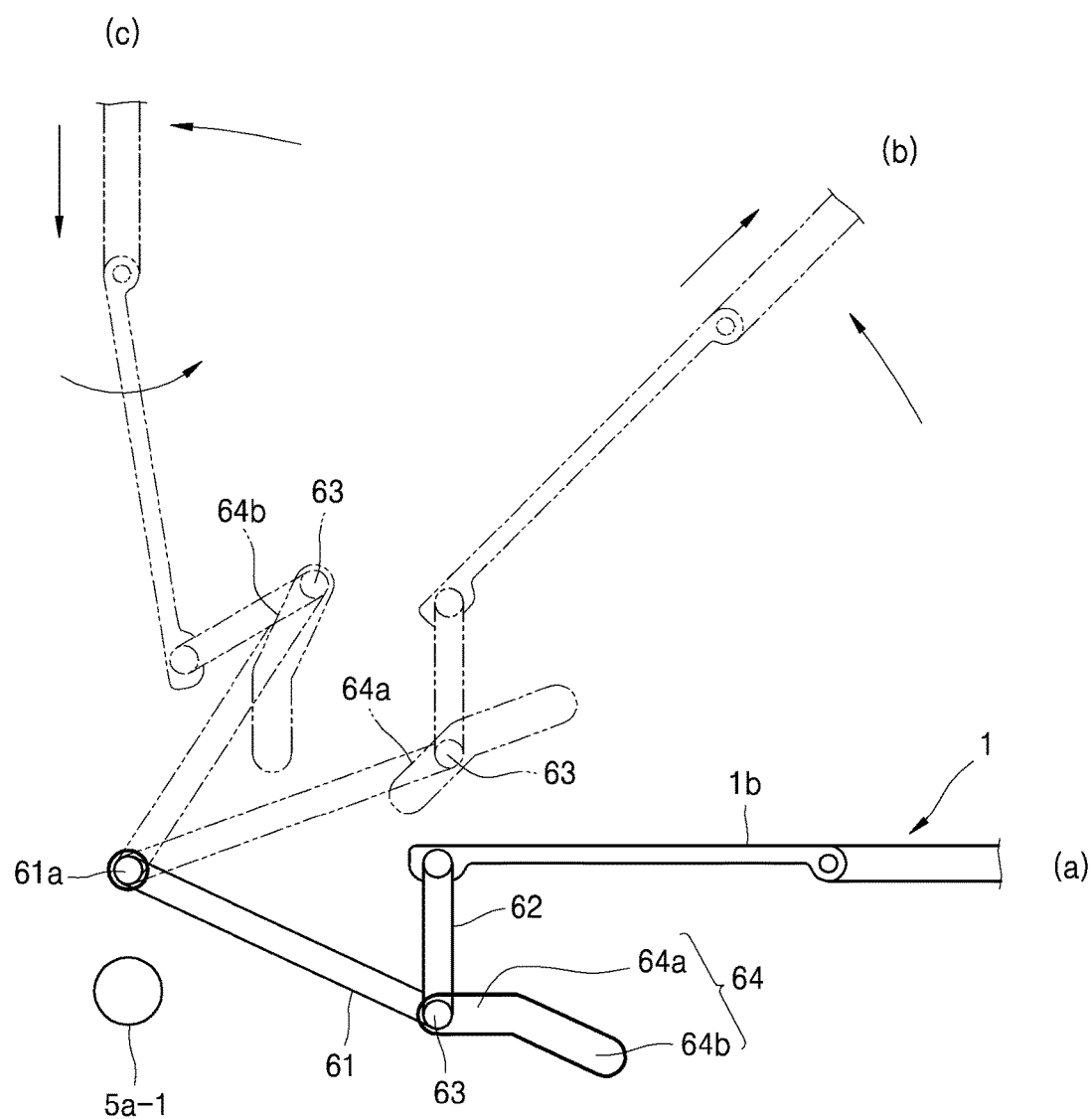
FIG. 15 is a schematic view of the restriction unit including two link arms according to an exemplary embodiment.

A structure of the restriction unit is not limited to that in FIGS. 13 and 14. The restriction unit according to an exemplary embodiment is shown in FIG. 15. The restriction unit of the present exemplary embodiment includes two link arms. Although only a mechanism that restricts the movement of the first support portion 1b is shown in FIG. 15, the same mechanism applies to a structure that restricts the movement of the second support portion 2b.

Referring to FIG. 15, first and second link arms 61 and 62 are illustrated. The first link arm 61 may pivot about a fixed position with respect to the first hinge shaft 5a-1. For example, the first link arm 61 may be pivotably supported on the fixed hinge 5-3. For example, a pivot pin 61a that is provided on one end portion of the first link arm 61 may be pivotably inserted into the first pivot hole 5c-4a of FIG. 14. One end portion of the second link arm 62 and the other end portion of the first link arm 61 are pivotably connected to each other by a guide pin 63. The other end portion of the second link arm 62 is pivotably connected to the first support portion 1b. The guide pin 63 is guided by a guide slot 64. The guide slot 64 may be formed in, for example, the first hinge frame 51-1. The guide slot 64 includes a support part 64a and a receiving part 64b. The support part 64a accommodates the guide pin 63 during a period when the foldable device moves from the unfolding position to the receiving start position. The receiving part 64b accommodates the guide pin 63 during a period when the foldable device moves from the receiving start position to the folding position.

In this configuration, the first and second link arms 61 and 62 and the first support portion 1b constitute a three-link (3-link) structure. In other words, in FIG. 13, the first and second support arms 56-1 and 56-2 respectively include the first and second link arms 61 and 62, and the first and second guide pins 56-1b and 56-2b pivotably connect the first and second link arms 61 and 62. The guide slot 64 is a modification of the first and second guide slots 57-1 and 57-2 of FIG. 13 in order to suit the 3-link structure.

FIG. 15 illustrates a state (a) wherein the first and second bodies 1 and 2 are located at the unfolding position. The guide pin 63 is located in the support part 64a and the first support portion 1b is maintained at the support position. In the state (a) of FIG. 15, when the first and second bodies 1 and 2 begin to fold, the first body 1 moves away from the first hinge shaft 5a-1 due to the path difference compensating unit. Until the first body 1 reaches the receiving start position as in a state (b) of FIG. 15, since the guide pin 63 is guided by the support part 64a, the first support portion 1b is maintained at the support position.

When the first and second bodies 1 and 2 fold beyond the receiving start position, the guide pin 63 is guided by the receiving part 64b. The first and second link arms 61 and 62 pull the first support portion 1b toward the receiving position, and thus the first support portion 1b pivots away from the rear surface of the flexible display device 4 and the receiving space 3 (see FIG. 3) begins to be formed in the first and second bodies 1 and 2. The first body 1 slides toward the first hinge shaft 5a-1 due to the path difference compensating unit, and the third part 4c of the flexible display device 4 is moderately bent and is received in the receiving space 3.

When the first and second bodies 1 and 2 reach the folding position as shown in a state (c) of FIG. 15, the first support portions 1b and 2b reach the receiving position and the receiving space 3 is formed in the first and second bodies 1 and 2 as shown in FIG. 3. The third part 4c of the flexible display device 4 forms the curved portion 4d and is received in the receiving space 3.

Figure 16A:
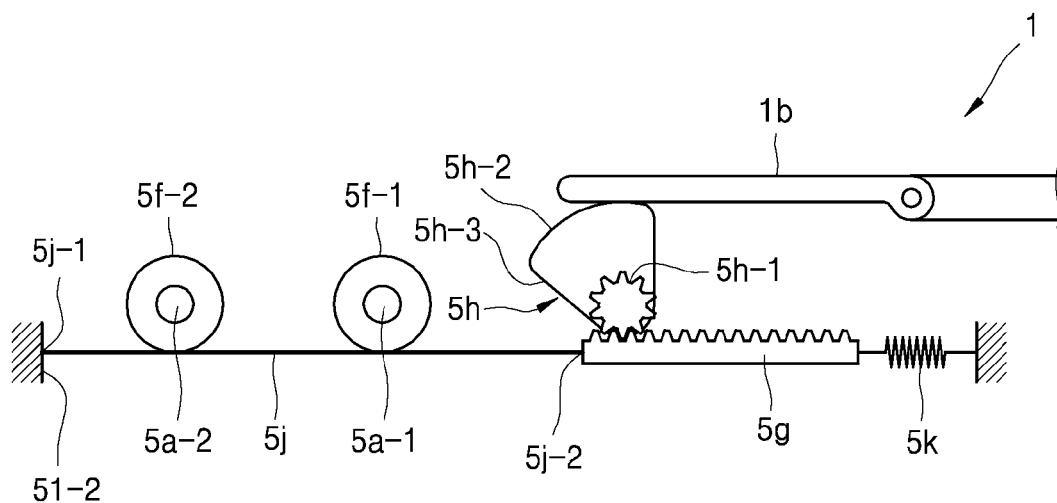
FIGS. 16A, 16B, and 16C are schematic views of the restriction unit according to another exemplary embodiment.
Figure 16B:
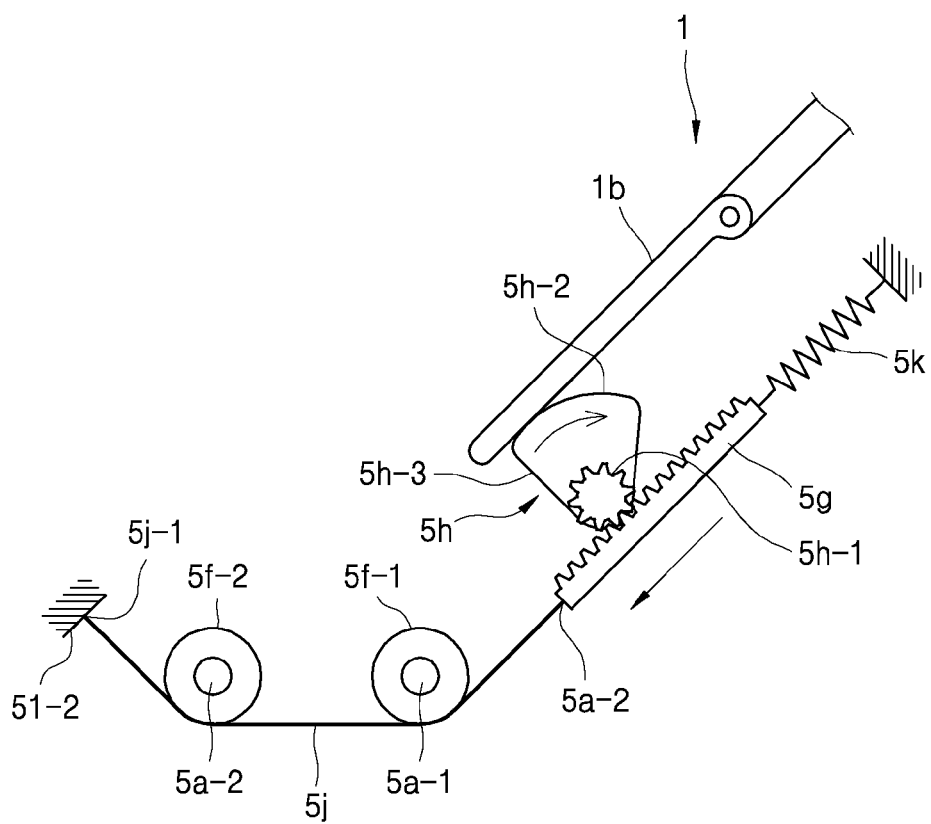
Figure 16C:
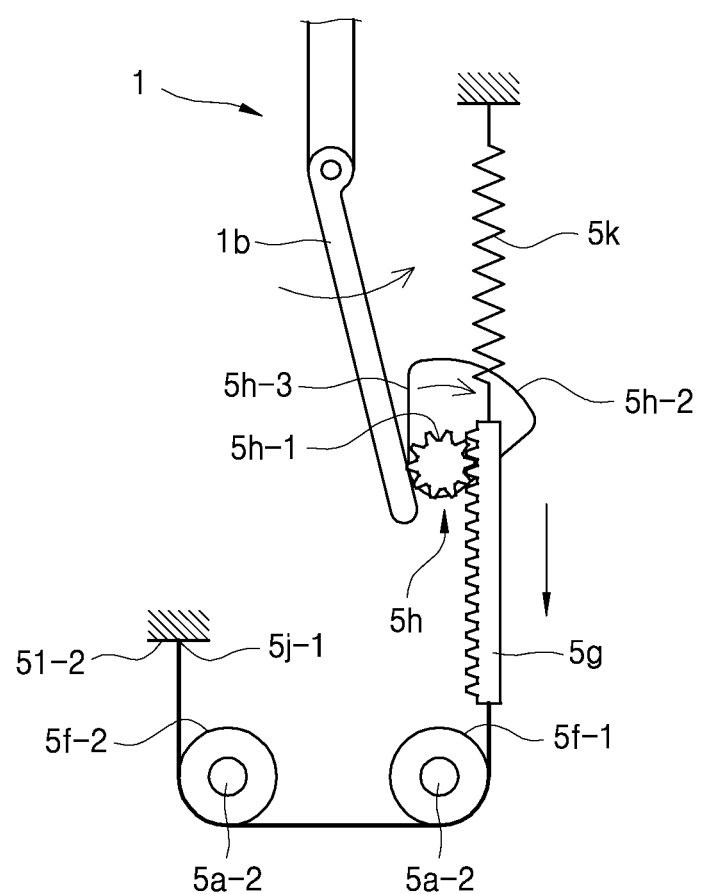

FIGS. 16A, 16B, and 16C are schematic views of the restriction unit according to another exemplary embodiment. Although a mechanism that moves the first support portion 1b between the support position and a receiving position is illustrated in FIGS. 16A, 16B, and 16C, the same mechanism applies to a structure that moves the second support portion 2b between the support position and the receiving position.

Referring to FIGS. 16A, 16B, and 16C, a connection member 5j is illustrated. The connection member 5j may be, for example, a wire. One end portion 5j-1 of the connection member 5j may be fixed to a fixed position with respect to the first hinge shaft 5a-1. The other end portion 5j-2 of the connection member 5j is connected to a rack gear 5g. The rack gear 5g may be slidably provided on, for example, the first hinge frame 51-1.

For example, the one end portion 5j-1 of the connection member 5j may be connected to the fixed hinge 5-3. A pulley 5f-1 is provided on the first hinge shaft 5a-1. The connection member 5j is in contact with the pulley 5f-1 and is wound around the pulley 5f-1 during a folding/unfolding process of the first and second bodies 1 and 2. When the connection member 5j is wound around the pulley 5f-1, a distance between a contact point between the connection member 5 and the pulley 5f-1 and the other end portion 5j-2 of the connection member 5 is changed, and the rack gear 5g slides.

When the one end portion 5j-1 of the connection member 5j is connected to the second hinge frame 51-2 and a pulley 5f-2 is provided on the second hinge shaft 5a-2, a sliding amount of the rack gear 5g may be increased by causing the connection member 5j to be wound around the pulleys 5f-1 and 5f-2 during a folding/unfolding process.

When the first and second bodies 1 and 2 unfold, a return spring 5k applies an elastic force to the rack gear 5g so that the rack gear 5g moves away from the first hinge shaft 5a-1.

The first support portion 1b is supported by a rotating cam 5h. A pinion gear 5h-1 that is engaged with the rack gear 5g is provided on the rotating cam 5h. Accordingly, as the rack gear 5g slides, the rotating cam 5h rotates. The rotating cam 5h includes a first cam path 5h-2 that has a constant distance from the center of rotation and a second cam path 5h-3 that has a reduced distance from the center of rotation. While the first support portion 1b is supported by the first cam path 5h-2, the first support portion 1b is maintained at the support position. When contact between the first support portion 1b and the first cam path 5h-2 ends, the first support portion 1b is supported by the second cam path 5h-3 and pivots to the receiving position.

FIG. 16A illustrates a state wherein the first and second bodies 1 and 2 are located at the unfolding position. The first support portion 1b is supported by the first cam path 5h-2 and is maintained at the support position.

In the state of FIG. 16A, when the first and second bodies 1 and 2 begin to fold, the connection member 5j begins to be wound around the first and second pulleys 5f-1 and 5f-2. Accordingly, the rack gear 5 slides toward the first hinge shaft 5a-1, and the rotating cam 5h rotates. Until the first and second bodies 1 and 2 reach the receiving start position as shown in FIG. 16B, since the first support portion 1b is guided by the first cam path 5h-2, the first support portion 1b is maintained at the support position.

When the first and second bodies 1 and 2 fold beyond the receiving start position, contact between the first cam path 5h-2 and the first support portion 1b ends and the first support portion 1b is supported by the second cam path 5h-3. Accordingly, the first support portion 1b pivots away from the rear surface of the flexible display device 4 and the receiving space 3 (see FIG. 3) begins to be formed in the first and second bodies 1 and 2. The third part 4c of the flexible display device 4 is moderately bent and begins to be received in the receiving space 3.

When the first and second bodies 1 and 2 reach the folding position as shown in FIG. 16C, the first support portion 1b reaches the receiving position and the receiving space 3 is formed in the first and second bodies 1 and 2 as shown in FIG. 3. The third part 4c of the flexible display device 4 forms the curved portion 4d and is received in the receiving space 3.

The return spring 5k is connected to the rack gear 5g and applies a tensile force to the connection member 5j having a wire shape. Accordingly, when the first and second bodies 1 and 2 unfold, due to an elastic force of the return spring 5, the rack gear 5g slides in a direction that is opposite to a direction in which the rack gear 5g slides when the first and second bodies 1 and 2 fold, and the rotating cam 5h also rotates in an opposite direction. Accordingly, the first support portion 1b returns from the receiving position to the support position.

Assuming that a strip having bending elasticity is used as the connection member 5j, when the first and second bodies 1 and 2 unfold, the strip is spread due to elasticity and pushes the rack gear 5g in a direction that is opposite to a direction in which the rack gear 5g slides when the first and second bodies 1 and 2 fold. Accordingly, the return spring 5k may be omitted.

Referring back to FIG. 6, a cover member 8 surrounds an area between the first and second hinge units 5-1 and 5-2 so that a receiving space in the foldable device is prevented from being exposed to the outside. For example, the cover member 8 may include an extending portion 81 that extends along facing edges of the first and second hinge units 5-1 and 5-2 and side wall portions 82 that are located on both end portions of the extending portion 81. The cover member 8 is coupled to the hinge unit 5 by slightly opening outward the side wall portions 82 to surround the first and second gear portions 51-1b and 51-2b.

Referring back to FIGS. 6 and 7, the movable support member 7 including a support surface 71 on which the third part 4c of the flexible display device 4 is supported is illustrated. The movable support member 7 is located at a first position at which the movable support member 7 supports the third part 4c of the flexible display device 4 when the first and second bodies 1 and 2 are located at the unfolding position. The movable support member 7 supports the third part 4c of the flexible display device 4 between the first and second support portions 1b and 2b. When the first and second bodies 1 and 2 change to the folding position, the movable support member 7 is spaced apart from the third part 4c of the flexible display device 4 and is located at a second position at which the receiving space 3 for receiving the curved portion 4d is formed. That is, the movable support member 7 moves between the first position and the second position as the first and second bodies 1 and 2 change between the unfolding position and the folding position. As such, when the first and second bodies 1 and 2 are located at the unfolding position, the third part 4c of the flexible display device 4 may be supported by the movable support member 7 to be spread flat. As the foldable device changes from the folding position to the unfolding position and the movable support member 7 is raised from the second position to the first position, the movable support member 7 may adjacently support the third part 4c of the flexible display device 4. Accordingly, even when the foldable device is used at the inclined position having a predetermined angle, the movable support member 7 may stably support the third part 4c of the flexible display device 4 along with the first and second support portions 1b and 2b, thereby reducing distortion of a screen at the third part 4c.

Figure 17:
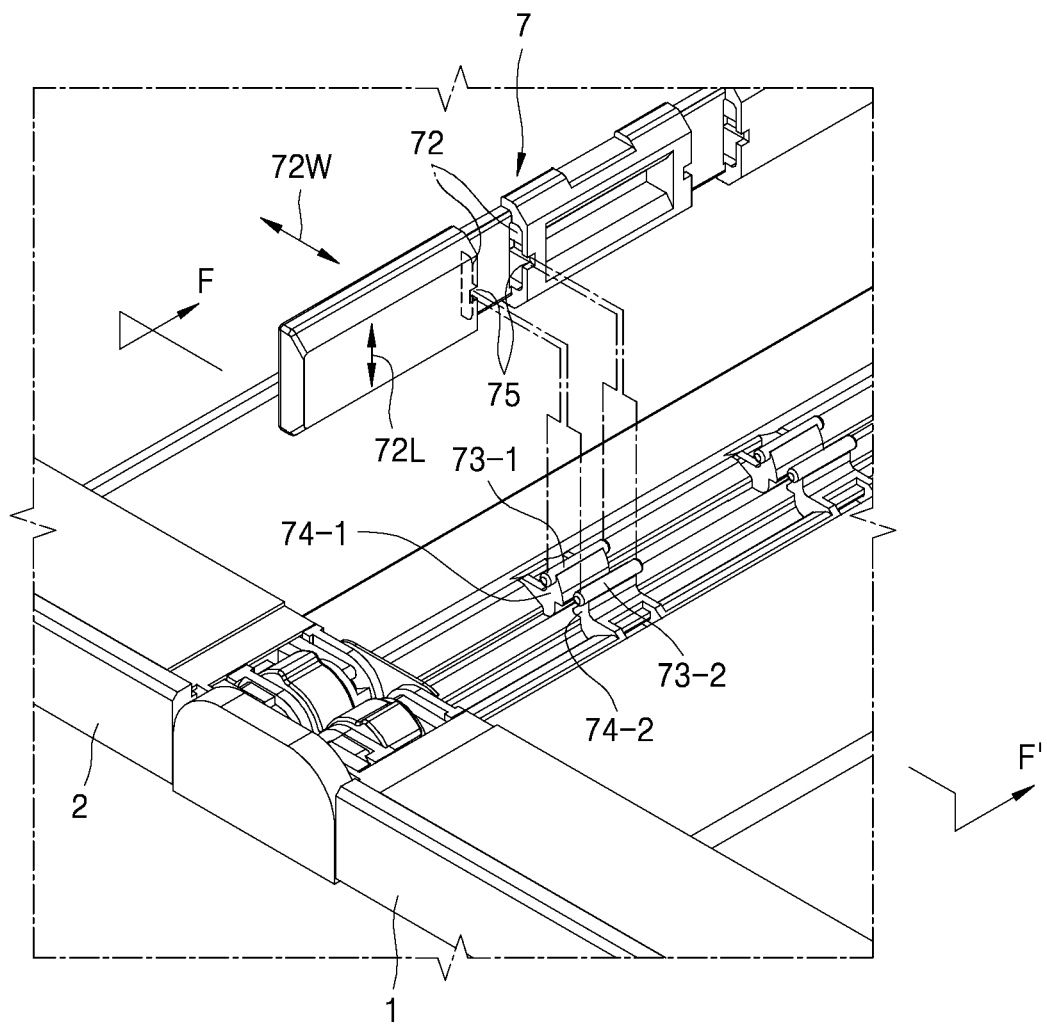
FIG. 17 is an exploded perspective view of a structure that moves a movable support member between a first position and a second position according to an exemplary embodiment.

FIG. 17 is an exploded perspective view of a structure that moves the movable support member 7 between the first position and the second position according to an exemplary embodiment. Referring to FIG. 17, slots 72 that extend in a folding/unfolding direction of the first and second bodies 1 and 2, that is, the longitudinal direction L, are formed in the movable support member 7. One pair of guide portions 73-1 and 73-2 that are inserted into the slots 72 are provided around facing edges of the first and second hinge units 5-1 and 5-2. For example, the guide portions 73-1 and 73-2 may be provided on upper ends of ribs 74-1 and 74-2 that respectively upwardly extend from the first and second hinge frames 51-1 and 51-2. Insertion grooves 75 are formed in the movable support member 7, and the guide portions 73-1 and 73-2 are inserted into the slots 72 through the insertion grooves 75. The insertion grooves 75 are formed at central portions of the slots 72 in a longitudinal direction 72L of the slots 72. While the first and second bodies 1 and 2 fold or unfold, the guide portions 73-1 and 73-1 move in the longitudinal direction 72L of the slots 72 and a movement path of the guide portions 73-1 and 73-2 does not overlap the insertion grooves 75. Accordingly, while the guide portions 73-1 and 73-2 are inserted into the slots 72 and then the movable support member 7 is raised and lowered, the guide portions 73-1 and 73-2 are not separated from the slots 72 through the insertion grooves 75.

Figure 18A:
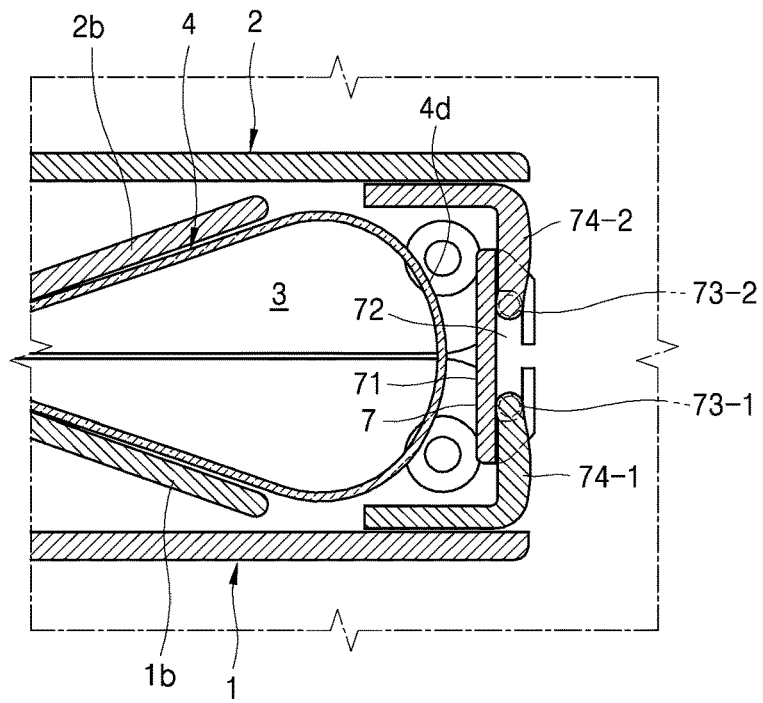
FIGS. 18A and 18B are cross-sectional views taken along line F-F' of FIG. 17, respectively illustrating a state wherein the movable support member is located at the second position and a state wherein the movable support member is located at the first position.
Figure 18B:
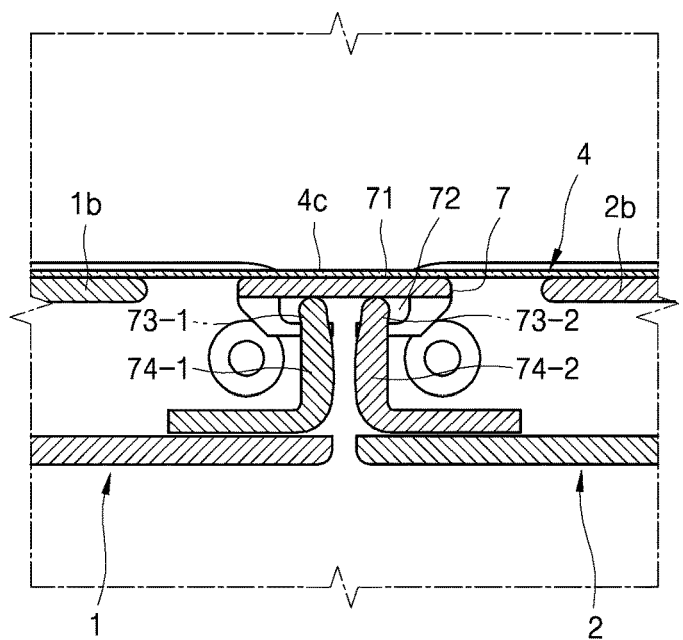

FIGS. 18A and 18B are cross-sectional views taken along line F-F' of FIG. 17, respectively illustrating a state wherein the movable support member 7 is located at the second position and a state wherein the movable support member 7 is located at the first position. Referring to FIG. 18A, the first and second bodies 1 and 2 are located at the folding position. The guide portions 73-1 and 73-2 are located at a farthest position from each other, and the movable support member 7 is located at the second position. The curved portion 4d of the flexible display device 4 is received in the receiving space 3 that is formed due to the first and second support portions 1b and 2b and the movable support member 7.

When the first and second bodies 1 and 2 unfold in the state of FIG. 18A, the guide portions 73-1 and 73-2 slide in the slots 72 to move toward each other, and the movable support member 7 is raised toward the flexible display device 4 and continuously adjacently supports the third part 4c of the flexible display device 4. Accordingly, even when the foldable device is used at the inclined position, the third part 4c of the flexible display device 4 may be stably supported by the first and second fixed portions 1a and 2a, the first and second support portions 1b and 2b, and the support surface 71 of the movable support member 7.

When the first and second bodies 1 and 2 are completely unfolded as shown in FIG. 18B, the movable support member 7 is located at the first position and the third part 4c of the flexible display device 4 is stably supported by the support surface 71.

The guide portions 73-1 and 73-2 and the slots 72 may be provided at two or more places in the width direction W of the foldable device in order for the movable support member 7 not to be inclined when being raised and lowered between the first and second positions.

The movement of the guide portions 73-1 and 73-2 in a width direction 72W of the slots 72 is restricted and the movement of the guide portions 73-1 and 73-2 in the longitudinal direction 72L of the slots 72 is allowed. That is, the vertical movement of the movable support member 7 is restricted by the guide portions 73-1 and 73-2. Accordingly, the movable support member 7 may be stably vertically raised and lowered without being shaken. Also, even when the first and second bodies 1 and 2 are located at the unfolding position, the support surface 71 of the movable support member 7 may not be inclined and may stably support flat the third part 4c of the flexible display device 4.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A foldable device comprising:
   a hinge comprising:
      a first hinge shaft; and
      a second hinge shaft;
   a flexible display comprising:
      a first part;
      a second part; and
      a third part between the first part and the second part;
   a first body which rotates around the first hinge shaft to move between a folding position and an unfolding position, the first body comprising:
      a first fixed portion to which the first part is fixed; and
      a first support portion which supports the third part in a support position when the first body is in the folding position and forms a receiving space for the third part to be received in a receiving position when the first body is in the unfolding position; and
   a restriction unit switches between providing support to the first support portion to support the third part in the support position and withdrawing the support from the first support portion to form the receiving space for the third part in the receiving position according to rotation of the first body around the first hinge shaft between the unfolding position and the folding position.

2. The foldable device of claim 1, further comprising:
   a second body which rotates around the second hinge shaft to move between the folding position and the unfolding position, the second body comprising:
      a second fixed portion to which the second part is fixed; and
      a second support portion which supports the third part in the support position when the second body is in the folding position and forms a receiving space for the third part to be received in the receiving position when the second body is in the unfolding position,
   wherein the restriction unit switches between providing support to the second support portion to support the third part in the support position and withdrawing the support from the second support portion to form the receiving space for the third part in the receiving position according to rotation of the second body around the second hinge shaft between the unfolding position and the folding position.

3. The foldable device of claim 2, wherein at the folding position, the first part and the second part face each other, wherein the third part is bent from the first part and the second part into the first body and the second body and is received in the receiving space in a droplet shape.

4. The foldable device of claim 3, further comprising a first gear portion and a second gear portion that are respectively provided on the first hinge shaft and the second hinge shaft and are engaged with each other so that the first body and the second body synchronously rotate together.

5. The foldable device of claim 4, further comprising a locking unit configured to lock the first body and the second body to at least one inclined position between the unfolding position and the folding position,
   wherein an opening angle between the first body and the second body at the receiving start position is equal to or less than an opening angle between the first body and the second body at the at least one inclined position.

6. The foldable device of claim 4, wherein the restriction unit comprises:
   a first support arm and a second support arm that respectively support the first support portion and the second support portion and respectively pivot about fixed positions with respect to the first hinge shaft and the second hinge shaft;
   a first guide pin and a second guide pin that are respectively provided on the first support arm and the second support arm; and
   a first guide slot and a second guide slot that respectively rotate around the first hinge shaft and the second hinge shaft along with the first body and the second body, respectively guide the first guide pin and the second guide pin, and comprise support parts that maintain the first support arm and the second support arm at a position at which the first support arm and the second support arm support the first support portion and the second support portion and receiving parts that allow the first support arm and the second support arm to move away from the first support portion and the second support portion so that the first support portion and second support portion are allowed to move to the receiving position.

7. The foldable device of claim 6, wherein each of the first support arm and the second support arm comprises:
   a first link arm that pivots about the fixed position; and
   a second link arm having one end portion that is pivotably connected to the first link arm by the first guide pin or the second guide pin and another end portion that is pivotably connected to the first support portion or the second support portion and supports the first support portion or the second support portion.

8. The foldable device of claim 2, wherein the restriction unit comprises:
   a rotating cam that supports the first support portion and the second support portion and comprises a first cam path corresponding to the support position and a second cam path corresponding to the receiving position;
   a pinion gear that is connected to the rotating cam;
   a rack gear that is engaged with the pinion gear;
   a pulley; and
   a connection member having one end portion that is connected to a fixed position with respect to the hinge and another end portion that is connected through the pulley to the rack gear and moves the rack gear when the first body and the second body fold or unfold.

9. The foldable device of claim 8, wherein the connection member has a strip shape having bending elasticity.

10. The foldable device of claim 8, wherein the connection member comprises a wire,
wherein the foldable device further comprises a return spring that is connected to the rack gear and applies a tensile force to the wire.

11. The foldable device of claim 2, further comprising a path difference compensating unit configured to restrict an amount of movement of at least one of the first body and the second body to or from at least one of the first hinge shaft and the second hinge shaft, and compensate for a path difference between the flexible display and the first body and a path difference between the flexible display and the second body while the foldable device folds or unfolds.

12. The foldable device of claim 11, wherein the path difference compensating unit is further configured to enable at least one of the first body and the second body to move away from the at least one of the first hinge shaft and the second hinge shaft during a period when the foldable device moves from the unfolding position to a changing position and enable at least one of the first body and the second body to move toward the at least one of the first hinge shaft and the second hinge shaft during a period when the foldable device moves from the changing position to the folding position.

13. The foldable device of claim 12, wherein an opening angle between the first body and the second body at the changing position is equal to an opening angle between the first body and the second body at the receiving start position.

14. The foldable device of claim 13, further comprising:
a first hinge unit that is pivotably connected to the first hinge shaft and is connected to the first body; and
a second hinge unit that is pivotably connected to the second hinge shaft and is connected to the second body,
wherein the first body and the second body are respectively connected to the first hinge unit and the second hinge unit so that the first body and the second body respectively move towards or away from the first hinge shaft and the second hinge shaft.

15. The foldable device of claim 14, wherein the first hinge unit and the second hinge unit respectively comprise:
a first hinge frame and a second hinge frame that are respectively rotatably connected to the first hinge shaft and the second hinge shaft; and
a first movable frame and a second movable frame that are respectively supported on the first hinge frame and the second hinge frame so that the first movable frame and the second movable frame respectively move towards or away from the first hinge shaft and the second hinge shaft,
wherein the first body and the second body are respectively coupled to the first movable frame and the second movable frame.

16. The foldable device of claim 11, wherein the path difference compensating unit comprises:
a first restriction pin and a second restriction pin that have fixed positions with respect to the first hinge shaft and the second hinge shaft; and
restriction slots into which the first restriction pin and the second restriction pin are respectively inserted and that respectively restrict amounts of movement of the first body and the second body according to rotation angles of the first body and the second body while the restriction slots pivot along with the first body and the second body.

17. A foldable device comprising:
a flexible display that comprises a first part, a second part, and a third part between the first part and the second part;
a first body and a second body to which the first part and the second part are respectively fixed, and that move between an unfolding position and a folding position at which the first part and the second part are located closer to each other that at the unfolding position and face each other and the third part is bent from the first part and the second part into the first body and the second body and is received in a receiving space in a droplet shape; and
a first support portion and a second support portion that are respectively provided on the first body and the second body to support the third part and are maintained at a support position at which the first support portion and the second support portion support the third part when the first body and the second body are in a position between the unfolding position and a receiving start position in which the third part starts to be received in the receiving space, and move to the receiving position at which the first support portion and the second support portion move away from the third part to form the receiving space when the first body and the second body fold beyond the receiving start position.

18. The foldable device of claim 17, wherein the first body and the second body respectively rotate about a first hinge shaft and a second hinge shaft and move between the unfolding position and the folding position,
wherein the foldable device further comprises a first gear portion and a second gear portion that are respectively provided on the first hinge shaft and the second hinge shaft and are engaged with each other so that the first body and the second body synchronously rotate together.

19. The foldable device of claim 18, further comprising a locking unit configured to lock the first body and the second body to at least one inclined position between the unfolding position and the folding position,
wherein an opening angle between the first body and the second body at the receiving start position is equal to or less than an opening angle between the first body and the second body at the at least one inclined position.

20. The foldable device of claim 19, wherein the first body and the second body are respectively movable to or from the first hinge shaft and the second hinge shaft.

21. The foldable device of claim 20, further comprising a path difference compensating unit configured to restrict an amount of movement of at least one of the first body and the second body to or from the first hinge shaft and the second hinge shaft, and compensate for a path difference between the flexible display and the first body and a path difference between the flexible display and the second body while the foldable device folds or unfolds.

22. A foldable device comprising:
a flexible display;
a first body and a second body that support the flexible display;
a hinge that includes a first hinge shaft and a second hinge shaft; and
a path difference compensating unit that is rotatably connected to the first hinge shaft and the second hinge shaft respectively, and to which the first body and the second body are slidably connected respectively, wherein the first body and the second body move away from and closer to the first hinge shaft and the second hinge shaft respectively as the first body and the second body rotate.

23. The foldable device of claim 2, wherein the restriction unit provides the support to the first support portion and the second support portion at the support position when the first body and the second body are in a position between the unfolding position and a receiving start position in which the third part starts to be received in the receiving space, and allows the first and second support portions to move to the receiving position by withdrawing the support from the first support portion and the second support portion when the first body and the second body fold beyond the receiving start position.

24. The foldable device of claim 22, wherein the path difference compensating unit comprises:

first and second restriction pins that have fixed positions with respect to the first and second hinge shafts respectively;

first and second hinge frames that are rotatably connected to the first and second hinge shafts respectively; and first and second moving frames that are slidably connected to the first and second hinge frames in a length direction of the first and second bodies respectively, and have first and second restriction slots to which the first and second restriction pins are inserted respectively, wherein the first and second bodies are connected to the first and second moving frames respectively and move away and close to with respect to the first and second hinge shafts as the first and second bodies rotate around the first and second hinge shafts respectively.

* * * * *